Sept. 12, 1950  H. A. SILVEN ET AL  2,522,485
GRINDING MACHINE

Filed May 25, 1948  10 Sheets-Sheet 1

Inventors
HERBERT A. SILVEN
CARL G. FLYGARE
By Harold W. Eaton
ATTORNEY

Sept. 12, 1950

H. A. SILVEN ET AL 2,522,485

GRINDING MACHINE

Filed May 25, 1948

INVENTORS
HERBERT A. SILVEN
CARL G. FLYGARE

By Harold W. Eaton
ATTORNEY

Sept. 12, 1950     H. A. SILVEN ET AL     2,522,485
GRINDING MACHINE
Filed May 25, 1948     10 Sheets-Sheet 3

INVENTORS
HERBERT A. SILVEN
CARL G. FLYGARE
By Harold W. Eaton
ATTORNEY

Sept. 12, 1950

H. A. SILVEN ET AL 2,522,485

GRINDING MACHINE

Filed May 25, 1948

Inventors
HERBERT A. SILVEN
CARL G. FLYGARE

By Harold W. Eaton
Attorney

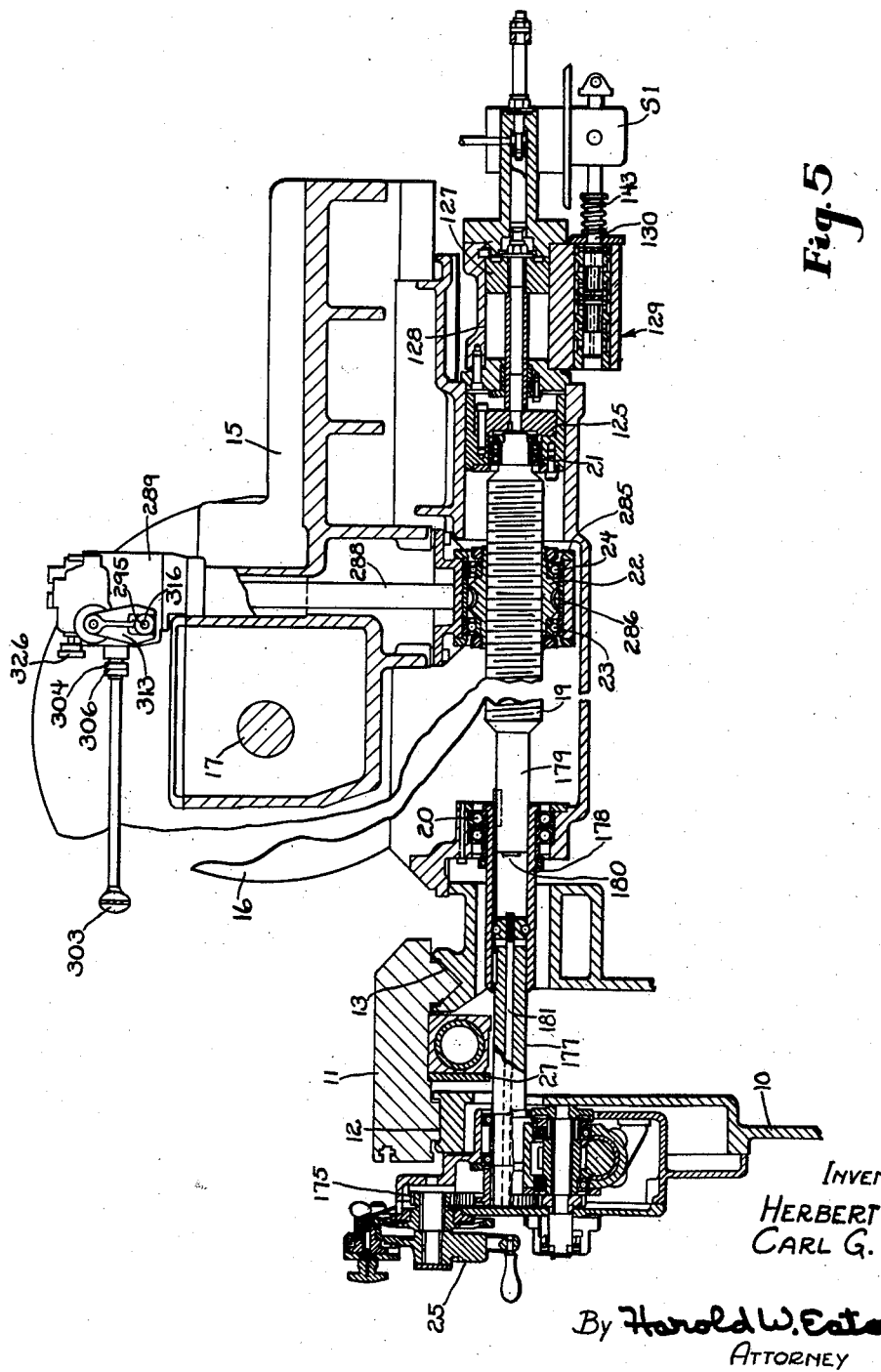

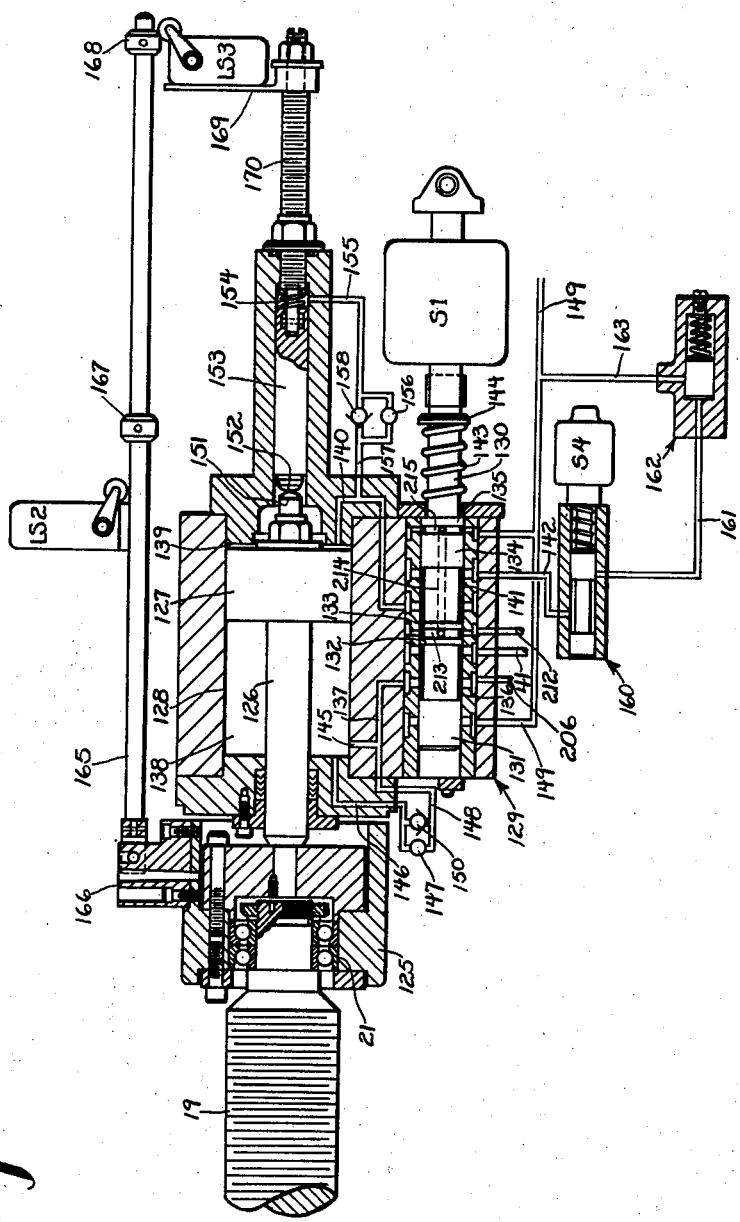

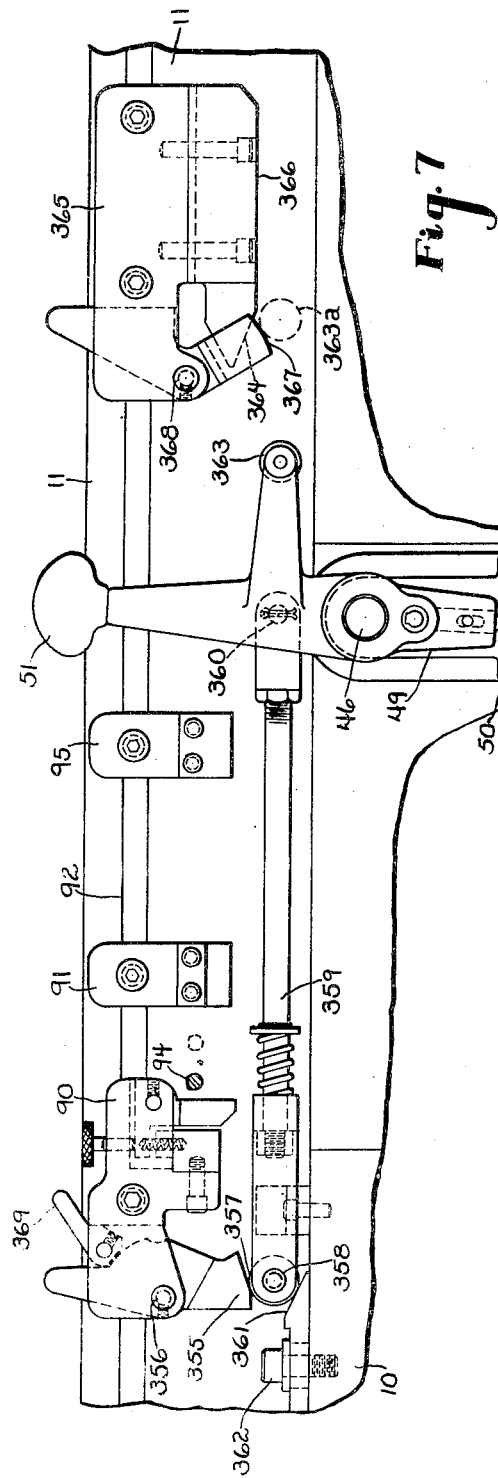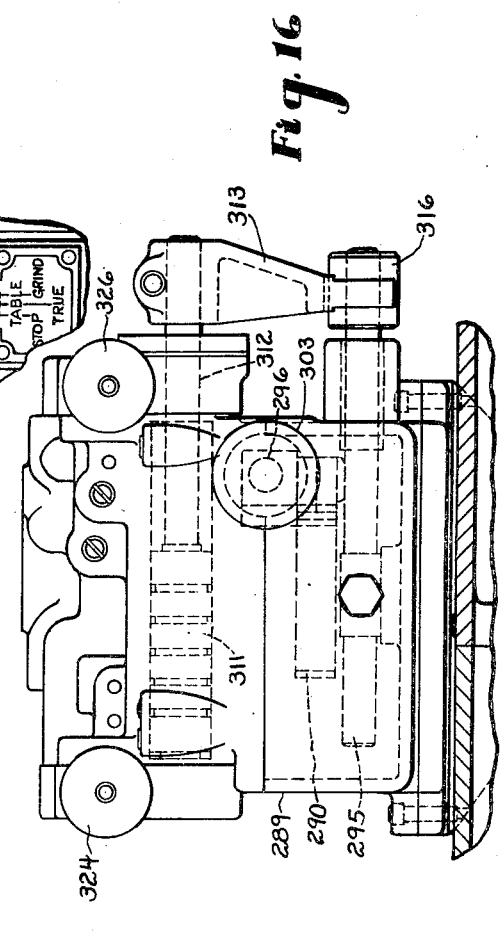

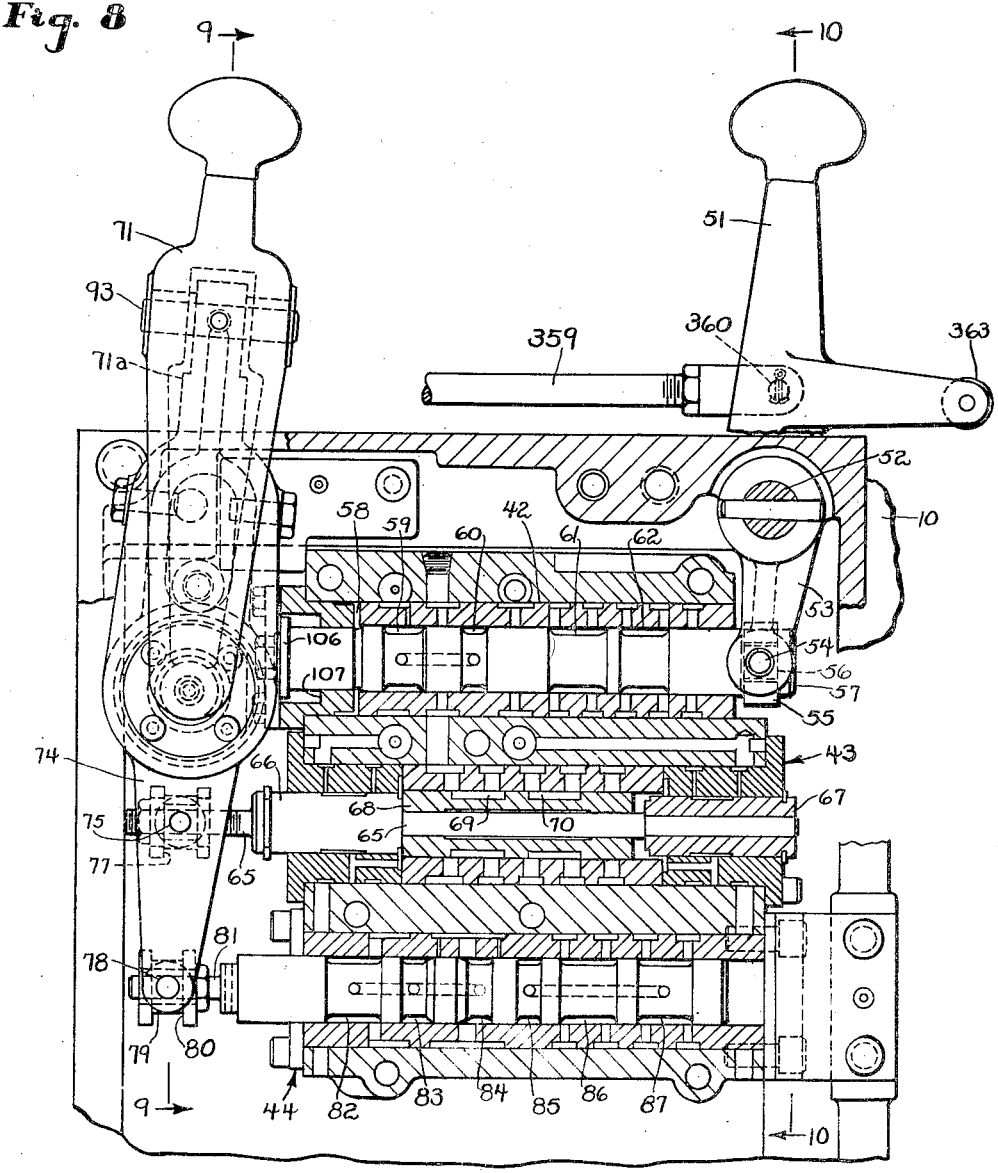

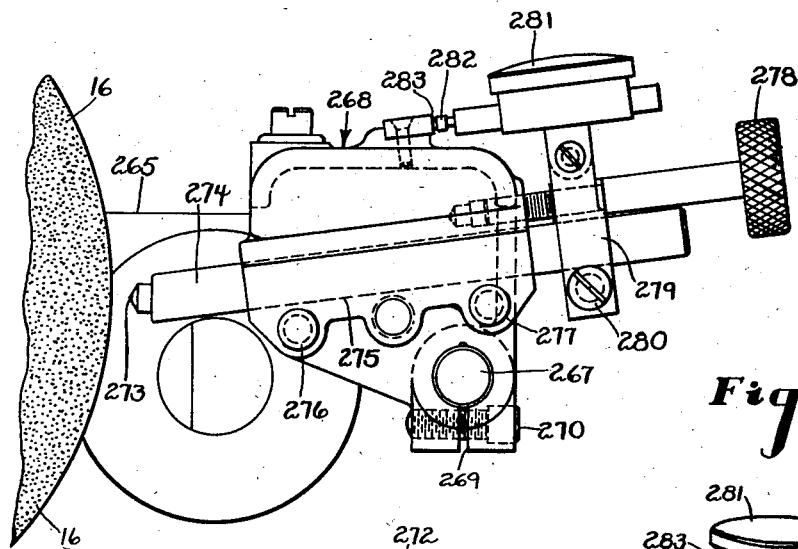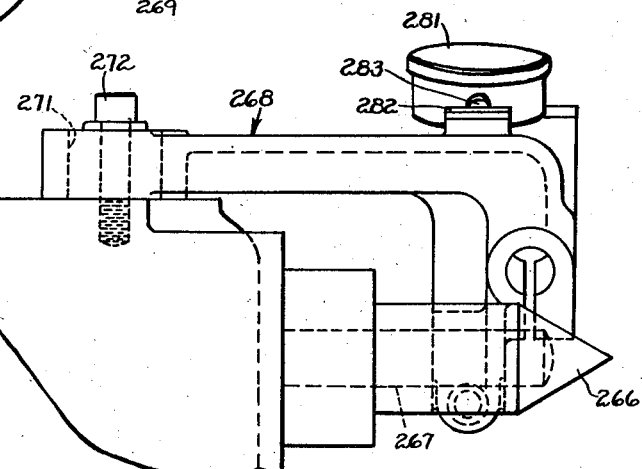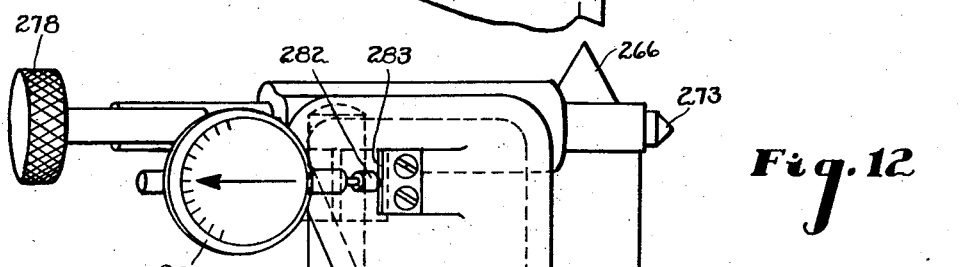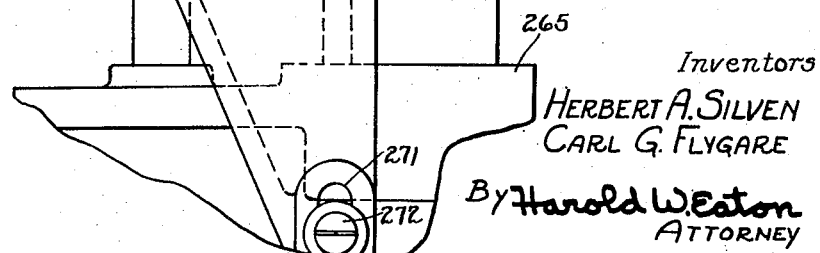

Sept. 12, 1950          H. A. SILVEN ET AL          2,522,485
                        GRINDING MACHINE Filed May 25, 1948                          10 Sheets-Sheet 10

INVENTORS
HERBERT A. SILVEN
CARL G. FLYGARE
By Harold W. Eaton
ATTORNEY

Patented Sept. 12, 1950

2,522,485

UNITED STATES PATENT OFFICE 2,522,485

GRINDING MACHINE

Herbert A. Silven and Carl G. Flygare, Worcester, Mass., assignors to Norton Company, Worcester, Mass., a corporation of Massachusetts Application May 25, 1948, Serial No. 29,156

19 Claims. (Cl. 51—95)

The invention relates to grinding machines and more particularly to a hydraulically operated cylindrical type grinding machine.

One object of the invention is to provide a simple and thoroughly practical cylindrical grinding machine. Another object of the invention is to provide a cylindrical grinding machine with an automatic truing mechanism whereby the grinding wheel may be automatically trued. Another object is to provide an automatic truing mechanism whereby the truing tool is automatically reciprocating through one complete reciprocation across the operative face of the grinding wheel. Another object is to provide a truing mechanism with an automatic feed for the grinding wheel whereby the grinding wheel is fed automatically toward the truing tool by a predetermined amount prior to each traverse of the truing tool across the wheel face.

A further object of the invention is to provide an independent adjustment for the wheel feed so that the feed may be independently adjusted prior to each pass of the truing tool across the face of the wheel so that the depth of cut of the truing tool may be varied during each pass of the truing tool. Another object of the invention is to provide an automatic truing of the grinding wheel when the grinding wheel is in a rearward or inoperative position and to provide an independent automatic feeding mechanism for the grinding wheel which is operative before each pass of the truing tool across the face of the grinding wheel to true the same without disturbing the setting of the grinding feed mechanism so that after a truing operation, grinding may be readily resumed without the necessity of resetting the wheel feed. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

One embodiment of the invention has been illustrated in the drawings, in which:

Fig. 4 is an electric wiring diagram;

Fig. 5 is a vertical cross sectional view, on a reduced scale, through the grinding wheel slide and the wheel feeding mechanism;

Fig. 6 is a fragmentary sectional view, on an enlarged scale, through the hydraulic rapid grinding wheel positioning mechanism;

Fig. 7 is a fragmentary front elevation, on an enlarged scale, of the table dog control mechanism;

Fig. 8 is a fragmentary vertical sectional view, on an enlarged scale, through the control valve apron, showing the control levers in elevation;

Fig. 11 is a left hand end elevation, on an enlarged scale of the grinding wheel truing apparatus;

Fig. 12 is a plan view of the truing apparatus as shown in Fig. 11;

Fig. 13 is a fragmentary rear elevation of the truing apparatus;

Fig. 16 is a front elevation, on an enlarged scale, of the wheel feeding mechanism for automatic truing.

Figure 1:
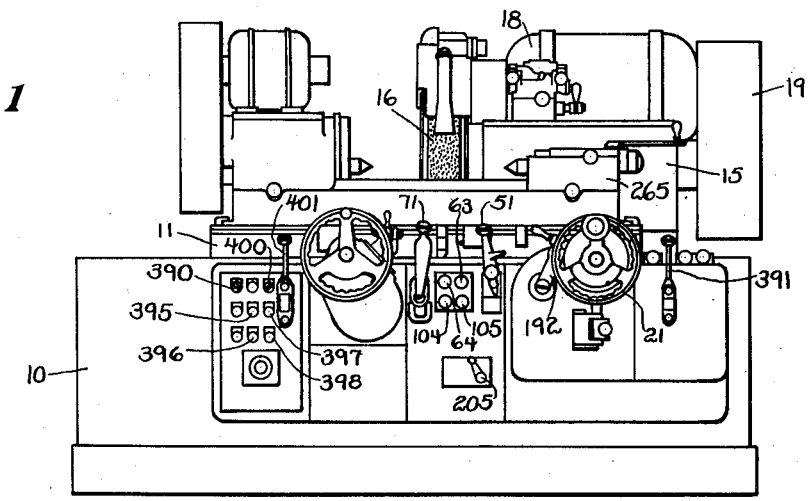
Fig. 1 is a front elevation of the improved cylindrical grinding machine.

An improved hydraulically operated grinding machine has been illustrated in the drawings comprising a base 10 which serves as a support for a longitudinally reciprocable work table 11. The work table 11 is slidably mounted on a flat way 12 and a V-way 13 formed on the upper surface of the base 10.

A transversely movable grinding wheel slide 15 is slidable mounted in the usual manner on a pair of transversely extending flat and V-ways (not shown). The wheel slide 15 serves as a support for a rotatable grinding wheel 16 which is mounted on one end of a rotatable wheel spindle 17. The wheel spindle 17 is preferably driven by means of an electric motor 18 mounted on the upper surface of the wheel slide 15. The motor 18 is connected by a driving belt (not shown) which is contained within a belt guard 19 (Fig. 1) with the other end of the wheel spindle 17.

The slide 15 is arranged to be fed transversely relative to the base 10 by means of a feed screw 19 which is journalled in anti-friction bearings 20 and 21. A rotatably mounted nut 22 meshes with the feed screw 19. It will be readily apparent from the foregoing disclosure that a rotary motion of the feed screw 19 will impart a transverse feeding movement through the nut 22 to the wheel slide 15 to the grinding wheel 16. The nut 22 is preferably rotatably supported in anti-friction bearings 23 and 24 to facilitate a rotary adjustment of the nut in a manner to be hereinafter described. The nut 22 is normally held against rotary motion during a grinding feed. A manually operable feed wheel 25 is mounted on the front of the machine base to facilitate manual adjustment of the feed screw 19. The driving connections between the hand wheel 25 and the feed screw 19 will be more fully described hereinafter.

The work table 11 is arranged so that it may be transversed longitudinally by means of a manually operable traverse wheel 26 which is operatively connected in the conventional manner to rotate a gear mechanism which meshes with a rack bar 27 (Fig. 5) depending from the underside of the work table 11. The table 11 is also arranged so that it may be reciprocated longitudinally by and automatically controlled hydraulically operated mechanism comprising a cylinder 28 which is mounted on the underside of the table 11. The cylinder 28 contains a pair of spaced pistons 29 and 30. The pistons 29 and 30 are connected by hollow piston rods 31 and 32 respectively with hollow brackets 33 and 34 which are fixedly mounted on opposite ends of the machine base 10.

Figure 3:
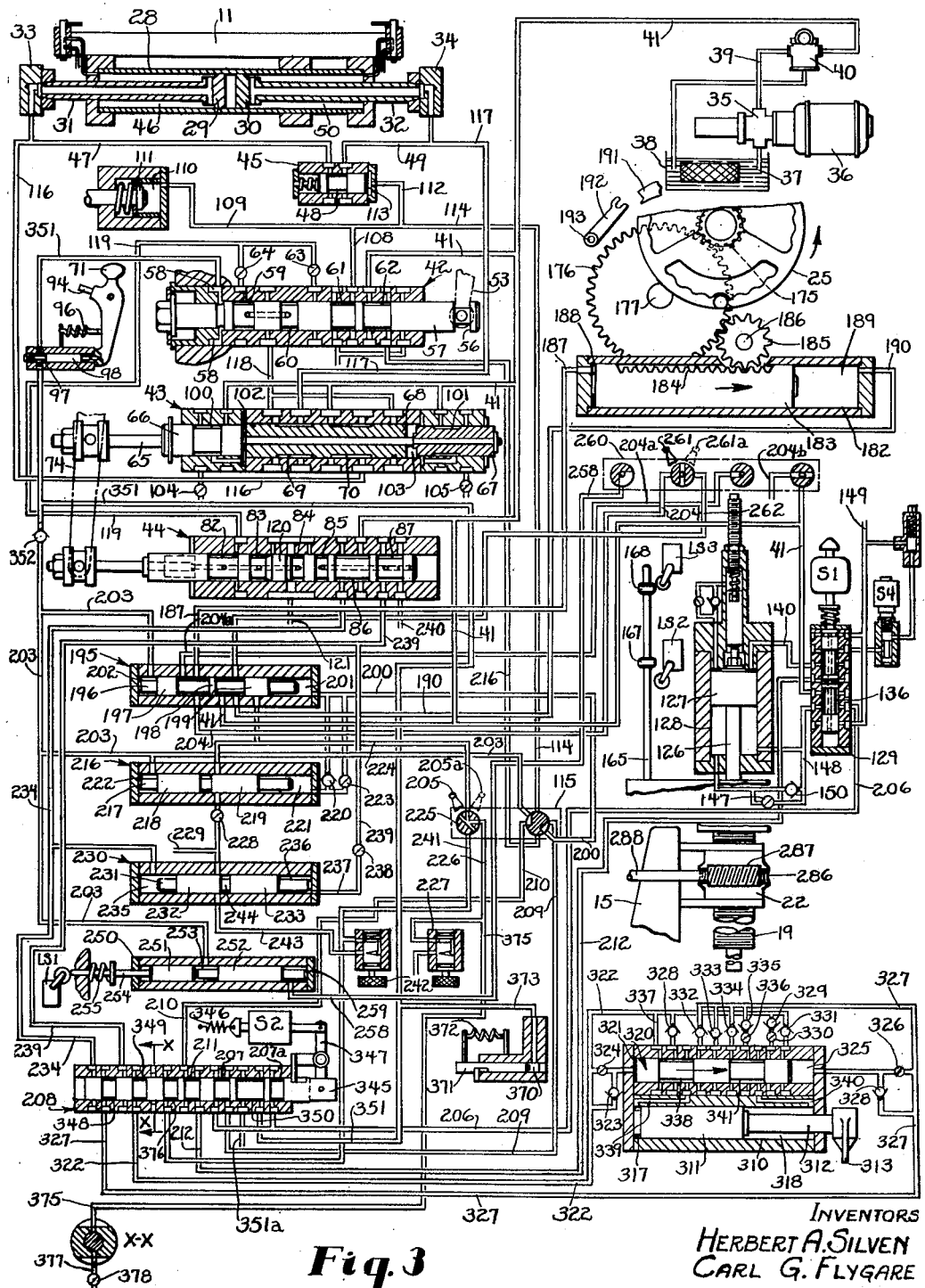
Fig. 3 is a hydraulic piping diagram showing the hydraulic actuating mechanisms and the control valves and piping therefor.

A fluid pressure system is provided comprising a fluid pump 35 which is driven by an electric motor 36. The fluid pump 35 draws fluid through a pipe 37 from a reservoir 38 formed within the base 10 of the machine. The pump 35 forces fluid under pressure through a pipe 39, through a balanced pressure relief valve 40, and through a pipe 41 to a manually operable start and stop valve 42. The pipe 41 also conveys fluid under pressure to a combined table reverse and dwell control valve 43 and also conveys fluid under pressure to a table reverse control valve 44. In the position of the valves as shown in Figure 3, a fluid actuated by-pass valve 45 is provided so that fluid may be readily by-passed between opposite ends of the cylinder 28 when the parts are in condition for a manual transversing movement of the table 11. As illustrated in Fig. 3, fluid within a cylinder chamber 46 may pass through the hollow piston rod 31, through the hollow bracket 33, through a pipe 47, through a valve chamber 48, through a pipe 49, through the hollow bracket 34, and through the hollow piston rod 32 into a cylinder chamber 50 formed at the right hand end of the cylinder 28. It will be readily apparent from the foregoing disclosure that in this position of the by-pass valve, the table 11 may be readily traversed by manual rotation of the traverse wheel 26 without the necessity of overcoming fluid under pressure within the system.

The start-stop valve 42 is arranged to be manually operated by means of a start-stop lever 51 which is mounted on the outer end of a rock shaft 52 which is in turn rotatably supported in fixed relation with the base 10 of the machine. The rock shaft 52 is provided with a downwardly extending arm 53, the lower end of which is yoke- shaped and provided with studs 54 which engage a collar 55. The collar 55 rides in a groove 56 formed in the right hand end of a valve stem 57. The valve stem 57 is provided with a plurality of valve pistons formed integral therewith forming valve chambers 58, 59, 60, 61 and 62.

In addition to serving as a start-stop valve, the valve 42 also serves as a speed control valve to regulate the speed of travel of the table 11 so that it may be traversed at either a grinding speed or a very slow speed for a grinding wheel truing operation. A needle valve 63 is provided for regulating the grinding speed and a needle valve 64 for regulating the truing speed of the table 11. The operation of the start-stop valve 42 and the needle valves 63 and 64 will be more fully described hereinafter.

The combined reverse and dwell control valve 43 comprises a valve stem 65 which serves as a support for a pair of pilot valves 66 and 67. The central portion of the valve stem 65 located between the pilot valves 66 and 67 serves as a support for a slidably mounted reversing valve 68. The reversing valve 68 is a piston type reversing valve having valve chambers or channels 69 and 70 which function in a manner to be hereinafter described to control the reversal of the table 11. A reversing lever 71 is keyed to a rotatable sleeve 72 which is in turn journalled on a cylindrically shaped supporting member 73 (Fig. 9) which is fixedly supported relative to the base 10. The sleeve 72 is provided with a downwardly extending arm 74 which is connected in the conventional manner by a stud 75 and a shoe 76 which rides in a groove 77 adjustably mounted on the valve stem 65. It will be readily apparent from the foregoing disclosure that when the reversing lever 71 is rocked in either direction, an endwise motion will be imparted to the valve stem 65.

The downwardly extending arm 74 is also connected by means of a stud 78 and a shoe 79 with a spool shaped member 80 which is adjustably mounted on the left hand end of a valve stem 81 of the reversing control valve 44. The valve stem 81 is provided with a plurality of integrally formed valve pistons forming valve chambers 82, 83, 84, 85, 86 and 87 which control the passage of fluid through the valve in a manner to be hereinafter described.

Figures 9, 10:
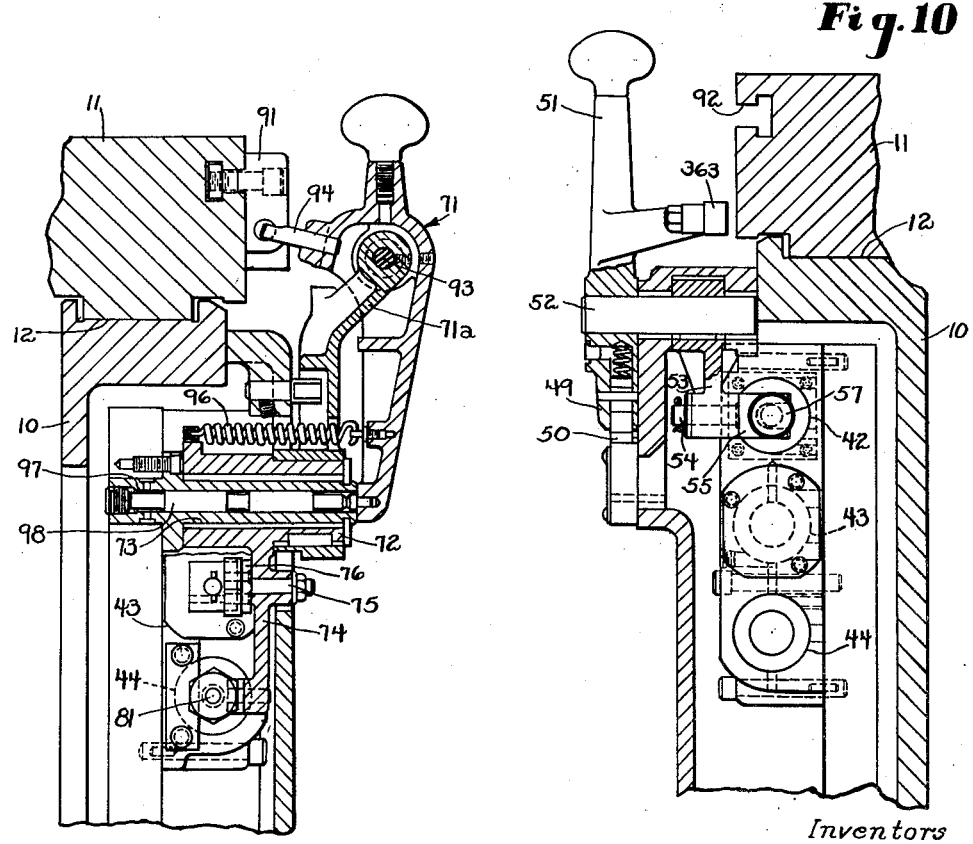
Fig. 9 is a fragmentary vertical sectional view, on a reduced scale, taken approximately on the line 9—9 of Fig. 8, through the control lever and apron.
Fig. 10 is a fragmentary vertical sectional view, on a reduced scale, taken approximately on the line 10—10 of Fig. 8.

The control lever 71 is arranged so that it may be operated manually to reverse the direction of travel of the table 11 or may be actuated automatically by means of a pair of table dogs 90 and 91 which are adjustably supported by a T slot 92 formed in the front face of the work table 11. The positions of the dogs 90 and 91 determine the length of the reciprocatory stroke of the table 11. In order to facilitate a truing operation, it is desirable to provide means for automatically allowing the table 11 to travel beyond its normal stroke into a truing position. In order to accomplish this result, the control lever 71 is formed in two parts. As illustrated in Fig. 9, the manually operable part of the control lever 71 is pivotally mounted on a horizontally arranged stud 93 which is supported by a second part 71a of the control lever 71. The manually operable part of the control lever 71 is arranged to rock about the stud 93 as a pivot and the combined control lever 71—71a is arranged to rock with the sleeve 72 to shift the valves 43 and 44. The control lever 71 is provided with an inwardly projecting stud 94 which is arranged in the path of the dogs 90 and 91. When it is desired to extend the traverse of the table 11 for a truing operation, the control lever 71 is rocked in a counter-clockwise direction (Fig. 9) so as to rock the pin or stud 94 out of the path of the dog 91 so that the table 11 may traverse a further distance toward the left. The movement of the table toward the left is determined by a third table dog 95 (Fig. 7). The lever 71 may be rocked either manually or automatically. As illustrated in Fig. 9, a tension spring 96 normally holds the control lever 71 with the stud 94 in an operative position. A fluid pressure cylinder 97 and a piston 98 are provided for automatically rocking the lever 71 to swing the stud 94 to an inoperative position.

The pilot valve 66 is formed with a valve chamber 100 which is operatively connected by a passage with a valve chamber 102 formed between the pilot valve 66 and the reversing valve 68. In the position illustrated in Fig. 3, fluid within the pilot valve chamber 100 may exhaust through a needle valve 104 which serves to control the shifting movement of the reversing valve 68 toward the left. Similarly, the pilot valve 67 is provided with a valve chamber 101 (Fig. 3) which is connected by a passage with a valve chamber 103 located between the pilot valve 67 and the reversing valve 68. In the position of the pilot valve as shown in Fig. 3, fluid under pressure from the pipe 41 enters the pilot valve chamber 101 and passes through the passage into the valve chamber 103 to cause the reversing valve 68 to move toward the left at a speed controlled by the needle valve 104. A needle valve 105 is similarly connected so that when the valve parts are shifted in the opposite direction, the needle valve 105 will control fluid exhausting from the valve chamber 103 thereby controlling the rate of movement of the reversing valve 68 toward the right. It will be readily apparent from the foregoing disclosure that the needle valves 104 and 105 serve as dwell control valves independently to control the extent of dwell at each end of the table stroke during a traverse grinding operation.

When it is desired to start a traverse grinding operation, the start-stop lever 51 is rocked in a counter-clockwise direction (Figs. 7 and 8) so as to shift the valve stem 57 toward the right (Fig. 3). The movement of the valve stem 57 toward the right is limited by movement of a collar 106 which is fixedly mounted on the left hand end of the valve stem 57 into engagement with a surface 107 of the valve sleeve. When the valve stem 57 is moved to the extreme right hand position, fluid under pressure from the pipe 41 enters a valve chamber 61 and passes outwardly through a pipe 108 which conveys fluid through a pipe 109 into a cylinder chamber 110 to cause a piston 111 to move toward the left (Fig. 3). This movement of the piston 111 serves to render the manually operable traverse mechanism inoperative during hydraulic movement of the table 11. At the same time fluid under pressure passing through a pipe 108 passes through a pipe 112 into a valve chamber 113 in the by-pass valve 45 to shift the valve piston toward the left (Fig. 2) so as to close the by-pass of fluid between the pipes 47 and 49. At the same time fluid under pressure passes through a pipe 114 to a selector valve 115 to be hereinafter described.

There is a differential piston area between the pilot valves 66 and 67 and the reversing valve 70. When the valve stem 65 is moved by shifting of the table reversing lever 71, fluid under pressure is admitted to either the valve chamber 102 or the valve chamber 103 depending upon the direction of movement of lever 71. Admission of fluid under pressure into valve chamber 102 or 103 serves to shift reversing valve 70 to cut off both intake and exhaust of fluid from table cylinder 28. Just before reverse valve 70 reaches this position, the valve 44 is shifted so that the tapered portion of the valve piston 120 decelerates the movement of the table 11. Due to the differential piston areas between pilot valves 66—67 and reversing valve 70, fluid under pressure in either valve chamber 102 or 103 serves to complete the shifting of the reversing valve 70, the reversing lever 71 and the reverse control valve 44 so as to gradually start the table 11 moving in the opposite direction. When the valve moves into a reverse position, a tapered portion on the valve piston 120 serves gradually to accelerate the movement of the table 11 as it starts moving in the reverse direction.

In the position of the valve 43 (Fig. 3), fluid under pressure in the pipe 41 passes through the valve chamber 70 and out through a pipe 116 which connects with the hollow bracket 33 so as to admit fluid under pressure to the cylinder chamber 46 thereby causing the cylinder 28 and the table 29 to move toward the left. During this movement of the table 11, fluid may exhaust from the cylinder chamber 50 through a pipe 117 into the valve chamber 69. Fluid exhausting into the cylinder chamber 69 passes through a pipe 118 into the valve chamber 59 in the valve 42 and passes through a central passage in the valve stem 57 into the valve chamber 60 and passes out through a needle valve 63 which serves to regulate the table speed during a grinding operation. Fluid exhausting through the needle valve 63 passes through a pipe 119 into the valve chamber 82 in the valve 44 and passes through a central aperture within the valve stem into the valve chambers 83 and 84. Due to the tapered end portions of a valve piston 120 located between the valve chambers 83 and 84, the exhaust of fluid through the pipe 119 may be gradually cut off to decelerate the motion of the table 11 before reversal and also gradually to accelerate the table after reversal has taken place. Fluid exhausting through valve chambers 83 and 84 of the valve 44 exhausts through a pipe 121 into the reservoir 38. It will be readily apparent from the foregoing disclosure that the combined reversing and pilot valve 43 serves to control the reversal of fluid under pressure within the hydraulic table cylinder and through throttle valves 104 and 105 controls the duration of dwell at the ends of the table stroke. The valve 44 serves precisely to regulate fluid exhausting from the table cylinder through the valve 43 and the valve 42 so as to cause a gradual deceleration of the table movement prior to reversal and a gradual acceleration of table movement after reversal has taken place thereby producing a precise accurate reversal of the table 11.

The needle valve 64 associated with the start-stop valve 42 serves to control fluid exhausting from the table cylinder when the valve 42 is in a truing position to produce a slower predetermined movement of the table 11 during a grinding wheel truing operation. The needle valve 64 is connected into the pipe line 119.

The table 11 continues its movement toward the left until table dog 91 engages stud 94 on the reversing lever 71 and rocks the reversing lever in a counter-clockwise direction to shift the valve stems 65 and 81 toward the right. Movement of the valve stem 65 toward the right serves to cut off fluid pressure from the valve chamber 70, but previous to that time the tapered end portion of the valve piston 120 gradually closes the exhaust port in the valve 44 to gradually decelerate the movement of the table 11. At the same time fluid under pressure from the pipe 41 is admitted to the pilot valve chamber 100, and through the passage into the valve chamber 102 to shift the reversing valve 68 toward the right (Fig. 3). During the movement of the reversing valve toward the right, fluid within the valve chamber 103 exhausts through pilot valve chamber 101 and needle valve 105. The rate of shifting of the reversing valve 68 is determined by the setting of the needle valve 105 so that the period of dwell at the left hand end of the stroke is readily controlled. After the reversing valve 68 has moved through a predetermined distance toward the right, fluid under pressure in the pipe 41 may enter the valve chamber 69 in the valve 43 and pass outwardly through the pipe 117 into the cylinder chamber 50 to cause the table 11 to start its movement toward the right. The starting of the table movement toward the right is controlled in a manner similar to that expressed above. Fluid within the cylinder chamber 46 exhausts through the valve chamber 70, through the pipe 118, through the valve chamber 59 in the start-stop valve 42 and out through the needle valve 63 into the valve chamber 82 of the valve 44 so that the tapered portion of the valve piston 120 will gradually open the exhaust port to gradually increase the exhaust of fluid through the pipe 121 thereby to gradually accelerate the movement of the table 11 in a direction toward the right. It will be readily apparent from the foregoing disclosure that the direction of movement of the table 11 is determined by the actuation of the reversing valve 43 and the reversal of the table 11 is precisely controlled by the simultaneous actuation of the reverse controlling valve 44.

A wheel positioning and feeding mechanism is provided for rapidly causing the grinding wheel 16 to move forwardly to an operative position after which the wheel is advanced at a slow predetermined grinding rate by means of an independent mechanism. The rapid positioning mechanism comprises a slidably mounted sleeve which supports the anti-friction bearings 21 which in turn support the rear end of the feed screw 19. A piston rod 126 is fixedly mounted relative to the sleeve 125 in axial alignment with the feed screw 19. The piston rod 126 is connected to a piston 127 which is slidably mounted within a hydraulic cylinder 128. The cylinder 128 is fixedly mounted relative to the base 10 of the machine.

A feed control valve 129 is mounted directly below the cylinder 128. This valve is a piston type valve comprising a valve stem 130 having valve pistons 131, 132, 133, 134 and 135 formed integrally therewith. As illustrated in Figure 6, fluid under pressure from the pipe 41 enters a valve chamber 136 located between the valve pistons 131 and 132 and passes through a passage 137 into a cylinder chamber 138 to cause the piston 127 to move toward the right (Fig. 6) into a rearward or inoperative position. During this movement of the piston 127, fluid within a cylinder chamber 139 may exhaust through a passage 140 into a valve chamber 141 and out through an exhaust pipe 142.

A compression spring 143 surrounds the valve stem 130 and is interposed between the end cap on the valve 129 and a collar 144 which is fixedly mounted on the valve stem 130. The compression of the spring 143 serves normally to hold the valve stem 130 in its extreme right hand end position (Fig. 6).

In the operation of this wheel positioning mechanism, the piston 127 moves forwardly into engagement with the left hand end of the cylinder (Fig. 6) before the wheel 16 engages the surface of the work to be ground. During the rearward feeding movement of the grinding wheel 16 and piston 127 to an inoperative position, the piston moves only part way toward the right hand end of the cylinder 128 except when the parts are moved for a grinding wheel truing operation. On the forward rapid stroke of the piston 127, it is desirable to cushion the rapid approaching movement as the piston 127 approaches the end of the cylinder 128. This is preferably accomplished by providing a port 145 which is formed at the end of the passage 137 which is spaced from the left hand end of the cylinder 128. It will be readily apparent that when the piston 127 moves a sufficient distance toward the left, the piston 127 will close the port 145 after which fluid may exhaust from the cylinder chamber 138 through a passage 146 through a needle valve 147 and through a passage 148 into the passage 137, through the valve chamber 136 and out through an exhaust pipe 149. A ball check valve 150 is connected between the passage 146 and 148 so that on the return idle stroke of the piston 127 to an inoperative or right hand end position (Fig. 6) substantially unrestricted flow of fluid under pressure from passage 137 through passage 148, through ball check 150 into the passage 146 thereby bypassing the needle valve 147 so as to start a rapid movement of the piston 127 toward the right. This movement continues until the port 145 is uncovered by the piston 127 after which fluid under pressure passes through the port 145 to complete the inoperative stroke of the piston 127.

When the wheel 16 is moved to an extreme rearward position for a truing operation, it is desirable to provide an automatic cushioning mechanism to retard the rapid rearward motion as the piston 127 approaches the end of its rearward stroke. A spherical end portion 151 is provided on the right hand end of the piston rod 126 which moves into engagement with a spherical end portion 152 formed on the left hand end of a dash pot piston 153. A dash pot cylinder 154 is provided at the other end of the piston 153 which is arranged to exhaust fluid through a passage 155, through a needle valve 156, through a passage 157 which connects with passage 140 so that fluid exhausting from the dash pot cylinder 154 will pass through the control valve 129 and out through the exhaust pipe 142. The setting of the needle valve 156 will determine the rate of rearward movement of the piston 127 as it approaches the end of its stroke thereby reducing the rapid rearward movement to a slow movement thus preventing undue vibrations in the machine. A ball check valve 158 is connected between the passage 157 and the passage 155 so that when fluid under pressure is passed through passage 140 into cylinder chamber 139 to cause an approaching movement of the piston 127, fluid may also pass through a passage 157, the ball check valve 158, the passage 155 into the dash pot cylinder 154 to return the dash pot piston 153 to its forward position so that it is ready for the next cycle of operation. The dash pot mechanism above described is operative only when the wheel slide is moved to an extreme rearward position for a truing operation, as will be hereinafter described. It will be readily apparent from the foregoing disclosure that the grinding wheel 16 may be rapidly moved to and from an operative position by admitting fluid under pressure into either the cylinder chamber 138 or the cylinder chamber 139.

A normally closed solenoid actuated control valve 160 serves to connect the exhaust pipe 142 with a pipe 161. The solenoid S4 is normally deenergized so that the valve 160 is closed. When the solenoid S4 is energized, the valve 160 is shifted toward the right (Fig. 6) to connect pipe 142 with pipe 161 so that fluid may then exhaust through a pressure actuated relief valve 162 and a pipe 163 into the pipe 149 which exhausts into the reservoir 38.

A suitable feeding mechanism is provided for producing a slow precise feeding movement of the grinding wheel during the grinding operation. In the preferred form, a hydraulically operated mechanism is provided so that the feed screw 19 may be rotated either continuously for a plunge-cut grinding operation or intermittently at the ends of the table stroke for a traverse grinding operation. As above described, a manually operable feed wheel 25 is mounted on the front of the machine base 10. The hand wheel 25 is operatively connected to rotate a gear 175 which meshes with a gear 176 which is keyed on the forward end of a rotatable shaft 177. The rear end of the shaft 177 is keyed within the forward end of a rotatable sleeve 178. The forward cylindrical end portion 179 of the feed screw 19 is slidably keyed within the hollow sleeve 178. The forward end of the portion 179 of the feed screw 19 is provided with a spherically shaped stop button 180 which is arranged to move into an engagement with a rounded end of an adjustably mounted stop screw 181 carried by the shaft 177. The rapid positioning movement of the grinding wheel 16 and wheel slide 15 as caused by the piston 127 continues until the stop button 180 engages the end of the stop screw 181 after which the grinding wheel may be fed at a slow rate either by manual rotation of the feed wheel 25 or by a hydraulically operated mechanism to be hereinafter described. This hydraulic mechanism may comprise a cylinder 182 (Fig. 3) which contains a slidably mounted piston 183. A plurality of rack teeth 184 are cut in the upper surface of the piston 183. The rack teeth 184 mesh with a gear 185 which is rotatably supported on a shaft 186. The gear 185 meshes with the gear 176 so as to transmit motion of the piston 183 to rotate the shaft 177 and the feed screw 19. When fluid under pressure is passed through a pipe 187 into a cylinder chamber 188 to cause the piston 183 to move toward the right (Fig. 3), a counter-clockwise motion is imparted to the hand wheel 25 and also a rotary motion is imparted to the feed screw 19 to cause an infeeding movement of the wheel slide 15. The infeeding movement continues until a stop abutment 191 carried by the feed wheel 25 moves into engagement with a stop pawl 192 which is pivotally supported by a stud 193 on the front of the machine base. During the movement of the piston 183 toward the right, fluid within a cylinder chamber 189 may exhaust through a pipe 190.

Similarly, when fluid under pressure is reversed and passed through the pipe 190 into the cylinder chamber 189, the piston 183 will be moved toward the left (Fig. 3) so as to cause a clockwise motion to be transmitted to the hand wheel and also to rotate the feed screw 19 to back off the grinding wheel 16 from the surface being ground.

A feed control valve 195 is provided for controlling the admission of fluid to and the exhausting of fluid from the cylinder 182. The feed control valve 195 is a piston type control valve comprising valve stem 196 having valve pistons 197, 198 and 199 formed integrally therewith. The valve 195 is a fluid pressure operated valve which is arranged so that when fluid under pressure is passed through a pipe 200 into an end chamber 201, the valve stem 196 will be moved into an extreme left hand end position as shown in Fig. 3. During movement of the valve stem 196 into this position, fluid within an end chamber 202 may exhaust through a pipe 203. In the position of the valve 195 (Fig. 3) fluid under pressure from the pipe 41 enters a valve chamber located between the valve pistons 198 and 199 and passes out through the pipe 190 to cause the feed piston 183 to move toward the left into the position illustrated in Fig. 3. At the same time fluid within the cylinder chamber 188 exhausting through the pipe 187 enters a valve chamber located between the valve pistons 197 and 198 and passes out through a pipe 204a, through a valve 260 and exhausts through pipe 204b into the reservoir 38.

The selector valve 115 above referred to is a rotary type valve having a control lever 205 which is arranged to be positioned as shown in full lines in Fig. 3 to facilitate a plunge-cut grinding operation or in a dotted line position 205a to facilitate a traverse grinding operation. In the full line position, that is plunge-cut, the selector valve 115 connects fluid under pressure so that the feed control valve 195 is controlled by and in timed relation with the feed control valve 129. When the selector valve 115 is positioned for a traverse grinding operation, that is with the lever in position 205a, the control of the feed control valve 195 is shifted so that the start-stop valve 42 will control actuation thereof. In other words, one of the functions of the selector valve 115 is to shift control to the feed control valve 195 from the control valve 129 to the start-stop valve 42 and vice verse depending upon whether a plunge-cut or traverse grinding operation is to be performed.

In the position of the valves as shown in Figure 3, fluid under pressure in the pipe 41 passes through a valve chamber 136 in the control valve 129 and passes through a pipe 206 into a valve chamber 207 in a truing control valve 208. Fluid entering the valve chamber 207 passes out through a pipe 209, through a pipe 200 into the valve chamber 201 to move and hold the valve 195 in its left hand end position. During this movement of the valve stem 196, fluid within the valve chamber 202 exhausts through pipe 203, through a chamber in the selector valve 115, through a pipe 210 through a valve chamber 211 in the truing control valve 208, through a pipe 212 into a valve chamber 213 in the valve 129, through a central passage 214 into a valve chamber 215 and exhausts through the exhaust pipe 149 (Fig. 6).

It is desirable to take up any backlash in the grinding feed mechanism rapidly before the grinding wheel engages the peripheral surface of the work to be ground. This is preferably accomplished by a backlash and rapid approach feed control valve 216. The valve 216 is a shuttle type valve comprising a valve stem 217 having valve pistons 218 and 219 formed integrally therewith. The shuttle valve 216 operates in timed relation with the feed control valve 195. When fluid under pressure is passed through the pipe 200 into the valve chamber 201 to shift the valve stem 196 toward the left, it also passes through a ball check valve 220 into a valve chamber 221 to move the valve stem 217 toward the left into the position illustrated in Fig. 3. During this movement fluid within a valve chamber 222 may exhaust through the pipe 203, through a chamber in the selector valve 115 and exhaust in the same manner as fluid exhausting from the end chamber 202 of the valve 195.

When an infeeding movement is initiated either during a plunge-cut or a traverse grinding operation, both of the valves 195 and 216 are moved toward the right by fluid under pressure. As illustrated in Fig. 3, the selector valve 115 is set for a plunge-cut grinding operation. When the solenoid S1 is energized to shift the control valve 129 to initiate a rapid approaching movement of the grinding wheel 16, fluid passing through the pipe 41 enters the valve chamber 141 and passes through the passage 140 to initiate a rapid approaching movement of the grinding wheel and also passes through the pipe 212, through the valve chamber 211, through the pipe 210 through a chamber in the selector valve 115 and through the pipe 203 into the end chamber 202 of the valve 195 and also into the end chamber 222 of the backlash and rapid approach feed control valve 216 to move both of the valves 195 and 216 toward the right (Fig. 3). The valve stem 196 of the valve 195 moves rapidly into a right hand end position so that fluid under pressure in the pipe 41 will pass through the valve chamber located between the valve pistons 197 and 198 of the valve 195 and pass out through the pipe 187 into the cylinder chamber 188 to initiate a grinding feed. At the same time fluid entering the end chamber 222 of the backlash control valve 216 moves the valve stem 217 toward the right at a rate controlled by a needle valve 223.

During the movement of the valve stem 196 toward the right, a port is uncovered so that fluid may exhaust from the cylinder chamber 189 through the pipe 190 into the valve chamber located between the valve pistons 198 and 199 and pass out through a pipe 224, through a chamber 225 in the selector valve 115 and pass out through a pipe 226 and exhaust through a plunge-cut feed control valve 227. In order to take up backlash and to obtain a rapid approach in the feed mechanism, fluid exhausting from the valve chamber located between the valve pistons 198 and 199 into the pipe 224 may also exhaust through a chamber located between the valve pistons 218 and 219 of the backlash control valve 216 during movement of the valve stem 217 toward the right and exhaust through a needle valve 228 and a pipe 229 into the reservoir 38. The quantity of fluid permitted to exhaust through the backlash control valve is determined by the speed of movement of the valve stem 217 and also the setting of the needle valve 228. By adjustment of the needle valves 223 and 228, sufficient additional fluid may be exhausted from the cylinder chamber 189 of the feed control cylinder 182 during its initial movement rapidly to take up backlash and to obtain a rapid approach in the parts of the feeding mechanism previously described. After the valve stem 217 has moved a sufficient distance so that the chamber located between the valve pistons 218 and 219 moves past the port at the end of the pipe 224, all fluid exhausting from the cylinder chamber 189 must then pass through the selector valve chamber 225 and through the plunge-cut feed control valve 227 which controls the rate of plunge-cut infeeding movement of the grinding wheel. The return stroke of the backlash valve stem 217 from its right hand end to its left hand end position is merely a resetting stroke to position the valve for the start of the next grinding operation. During this return stroke when fluid under pressure is passed through the pipe 200, it may pass substantially unrestricted through the ball check valve 220 into the valve chamber 221 rapidly to move the backlash valve stem 217 into its left hand end position.

A picker feed control valve 230 is provided to control the infeeding movement of the grinding wheel 16 at the ends of the table stroke when the selector valve control lever 205 is moved into position 205a for a traverse grinding operation. The valve 230 is a shuttle type valve comprising a valve stem 231 having valve pistons 232 and 233 formed integrally therewith. A pipe 234 is arranged to convey fluid under pressure from the pipe 41 through the valve chamber 86 in the reverse control valve 44 into an end chamber 235 in the picker feed control valve 230 to move the valve stem 231 toward the right (Fig. 3). During this movement fluid within an end chamber 236 exhausts through a pipe 237 through a needle valve 238 and a pipe 239 into the valve chamber 87 in the reverse control valve 44 and out through an exhaust pipe 240 into the reservoir 38. The rate of movement of the valve stem 231 may be regulated by the adjustment of the needle valve 238.

With the selector valve 115 set in a traverse grinding position, fluid exhausting from the cylinder chamber 189 passes through the valve 195 in a manner above described through the pipe 224, through the chamber 225 in the selector valve 115 and through a pipe 241 and through a traverse infeed control valve 242, through a pipe 243. During the shifting movement of the reversing valve 43 and the reverse control valve 44, fluid under pressure is admitted to shift the valve stem 231 endwise. During this movement in either direction as controlled by the needle valve 238, a valve chamber 244 momentarily uncovers a port at the end of the pipe 243 to allow a predetermined quantity of fluid to exhaust from the cylinder chamber 189 through the pipe 243, through the valve chamber 244 in the picker feed control valve 230 and out through the exhaust pipe 229. By regulating the picker feed control valve 242 and by regulating the needle valve 238 to control the speed of movement of the valve stem 231, a predetermined infeeding movement of the grinding wheel 16 may be obtained during each reversal of the table at the ends of its stroke.

It is desirable to provide means for automatically stopping and starting the work drive motor 257 and the coolant drive motor 256 so that when the grinding operation is initiated both of the motors will be set in motion as the grinding wheel is fed into the work. To accomplish this result, a shuttle type valve 250 is provided which contains a pair of disconnected slidably mounted pistons 251 and 252. A chamber 253 is formed between the pistons 251 and 252 so that when fluid under pressure is passed through the pipe 203 it will enter the chamber 253. A slidably mounted plunger 254 engages the left hand end of the piston 251 and is normally urged in a direction toward the right (Fig. 3) by means of a compression spring 255. The plunger 254 is arranged in the path of an actuating roller of a limit switch LS1. When fluid under pressure is admitted to the valve chamber 253, the piston 252 being in engagement with the right hand end of the valve 250, the piston 251 will be moved toward the left to transmit a corresponding motion to the plunger 254 so as to close the normally open limit switch LS1 thereby starting both a coolant pump motor 256 and a work drive motor 257 (Fig. 4). Similarly, when fluid under pressure is admitted through a pipe 258 into a chamber 259, both the piston 252 and the piston 251 will be moved toward the left against the compression of the spring 255 so as to close the normally open limit switch LS1. When the limit switch LS1 is closed, a relay CR1 is energized so as to close a circuit to start the coolant motor 256 and to close a second circuit to start the work drive motor 257 (Fig. 4).

It is desirable to provide means for relieving the pressure in both ends of the feed cylinder 182 to facilitate manual movement of the feed wheel 25 in case it is desired to move the grinding wheel 16 away from or toward the work or to facilitate movement of the feed pawl 192 out of the path of the abutment 191 without overcoming the pressure of fluid within either of the cylinder chambers 188 or 189. This is preferably accomplished by providing a manually operable valve 260 having an actuating lever 261. The actuating lever 261 in a full line position (Fig. 3) is connected for either a plunge-cut or a traverse grinding operation. If it is desired to relieve the pressure in both ends of the feed cylinder 182, the lever 261 is shifted into position 261a so that fluid may by-pass from cylinder chamber 188 through pipe 187 through a chamber located between the valve pistons 197 and 198 in the valve 195, through the pipe 204 through a passage in the valve 260, through a pipe 262 into a valve chamber located between the valve pistons 198 and 199 of the valve 195 and through the pipe 190 with cylinder chamber 189. In this position of the valve 260, it will be readily apparent that fluid is permitted to by-pass between the cylinder chamber 188 and the cylinder chamber 189 so that the feed wheel 25 may be manually turned without undue exertion on the part of the operator. When the valve 260 is in the by-pass position, fluid may pass through a central aperture in the valve 260 and through the pipe 258 into the chamber 259 to move the pistons 252 and 251 so that the limit switch LS1 is closed to rotate or to maintain rotation of both the coolant pump motor 256 and the work drive motor 257.

The machine is provided with a grinding wheel truing device whereby the grinding wheel may be automatically trued after which grinding may be resumed without the necessity of resetting or adjusting the wheel feed mechanism. A footstock 265 is mounted on the table 11 for supporting a footstock center 266 in engagement with the right hand end of the work piece to be ground. A rod 267 projects from the left hand end face of the footstock 265 and serves as a support for a truing tool bracket 268. The bracket 268 is provided with a split portion 269 and a clamping screw 270 by means of which the bracket 268 may be clamped in adjusted position on the rod 267. The bracket 268 is provided with a horizontally extending portion which is provided with an elongated slot 271. A clamping screw 272 passes through the slot 271 and is screw threaded into the upper surface of the footstock 265. This clamping screw and horizontal portion of the bracket 268 serves to steady and support the truing tool during a truing operation. A truing tool or diamond 273 is mounted in the left hand end of a rod 274 which fits within a cylindrical aperture 275 formed in the bracket 268. A pair of clamping screws 276 and 277 are provided for clamping the rod 274 in adjusted position.

In order to facilitate a precise adjustment of the diamond 273, a manually operable screw 278 is provided. This screw is screw threaded into a portion of the bracket 268. The screw 278 is rotatably supported in a bracket 279 which is held in a relatively fixed position on the rod 274 by a clamping screw 280. The bracket 279 also serves as a support for a dial indicator 281 having an actuating plunger 282 engaging a reference surface 283 on the bracket 268. In order to set up the truing tool for a truing operation and also to compensate for wear of the diamond 273, the clamping screws 276 and 277 may be released and the screw 278 adjusted to the desired extent in accordance with the dial indicator reading so that the diamond 273 will be precisely positioned for an automatic truing operation. After adjustment has been completed, the clamping screws 276 and 277 are again clamped to lock the rod 274 and the diamond 273 in an adjusted position.

It is desirable to provide a suitable means for feeding the grinding wheel toward the truing tool independent of the feeding mechanism above described so that the grinding wheel slide 15 and the grinding wheel 16 may be advanced without disturbing the setting of the grinding wheel feeding mechanism. As previously explained, the nut 22 is rotatably supported by anti-friction bearings 20 and 21 which are in turn supported by a bracket 285 which is fixedly mounted on the underside of the wheel slide 15. A worm gear 286 is formed in the outer peripheral surface of the nut 22. The worm gear 286 meshes with a worm 287 formed on the lower end of the vertically extending shaft 288. It will be readily apparent from the foregoing disclosure that by rotation of the shaft 288, the nut 22 may be rotated relative to the screw 19 to adjust the position of the slide 15 relative thereto.

A suitable automatic feeding mechanism is provided within a casing 289 mounted on top of the wheel slide 15. A ratchet wheel 290 is mounted on the upper end of the shaft 288. An actuating pawl 291 is pivotally supported by a stud 292 which is carried by a pawl arm 293 which is arranged to rotate about the shaft 288. A gear segment 294 is formed on the pawl actuating arm 293 which meshes with a slidably mounted rack bar 295 which is arranged to be moved longitudinally by means of a hydraulically operated mechanism to be hereinafter described automatically to advance the wheel slide before each pass of the diamond 273 across the face of the grinding wheel 16.

Figure 14:
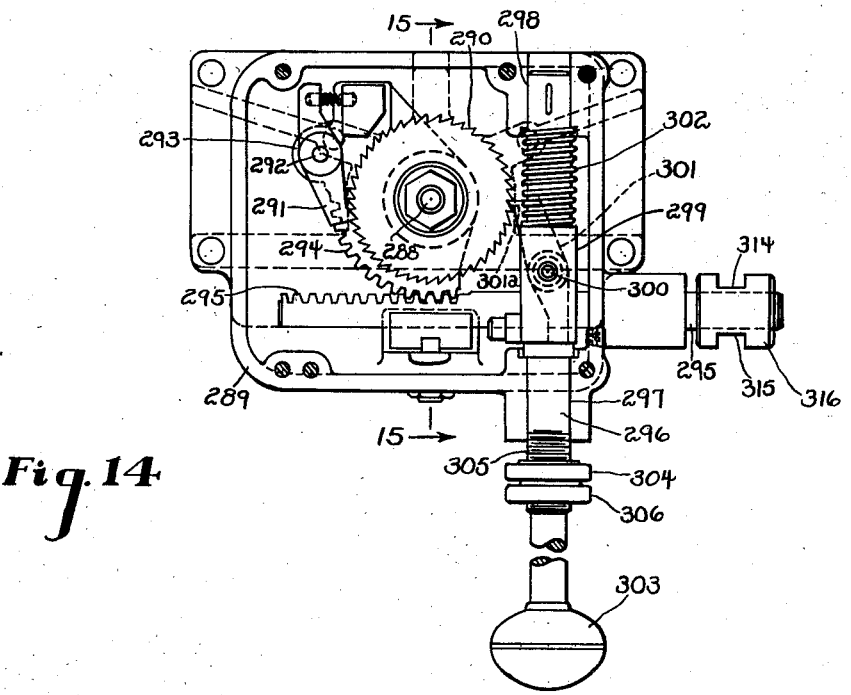
Fig. 14 is a plan view, on an enlarged scale of the wheel feeding mechanism for automatic truing, with the upper portion removed.
Figure 15:
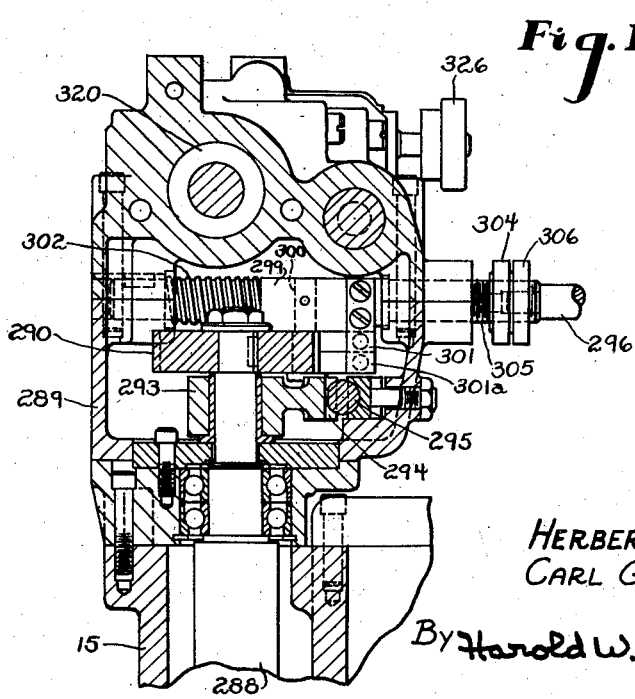
Fig. 15 is a vertical sectional view, taken approximately on the line 15—15 of Fig. 14.

It is desirable to provide a manual means of turning the ratchet wheel 290 to compensate for grinding wheel wear between truing cycles without disturbing the setting of the wheel feeding mechanism. This mechanism may comprise a transversely extending slidably mounted shaft 296. The shaft 296 is slidably mounted in bearing surfaces 297 and 298 formed in the casing 289. The shaft 296 serves as a support for a bracket 299 which serves as a support for a stud 300. The stud 300 serves as a pivotal support for a pawl 301 which is arranged to engage the teeth of the ratchet wheel 290. A compression spring 302 normally maintains the shaft 296 in a downward position (Fig. 14). An actuating knob 303 is mounted on the outer end of the shaft 296 by means of which the pawl 301 may be manually actuated to turn the ratchet wheel 290 and thereby to impart a rotary motion to the nut 22. A nut 304 on a threaded portion 305 of the shaft 296 serves to limit the upward motion of the shaft 296 thereby controlling the extent of movement of the pawl 301. By adjusting the nut 304, one or more teeth of the ratchet wheel may be picked up at each actuation of the knob 303. A lock nut 306 serves to hold the nut 304 in adjusted position. The pawl 301 is preferably formed as two pawls 301 and 301a, one of which is slightly shorter than the other so that when the knob 303 is actuated, a fraction of a tooth or more on the ratchet wheel 290 may be picked up for each actuation thereof. The pawl 301a being slightly shorter than the pawl 301 will permit actuation of the ratchet wheel 290 less than one tooth at each actuation of the knob 303.

A hydraulically operated mechanism is provided for actuating the rack bar 295 automatically to feed the grinding wheel 16 inwardly by varying amounts before each pass of the truing tool across the operative face of the grinding wheel 16. This mechanism preferably comprises a hydraulic cylinder 310 which is formed within the casing 289. The cylinder 310 contains a piston 311 which is provided with a piston rod 312. A yoked member 313 is mounted on the right hand end of the piston rod 312 (Fig. 3). The yoked member 313 rides within grooves 314 and 315 formed in a sleeve 316 which is fixedly mounted on the right hand end of the rack bar 295 (Fig. 14). When fluid under pressure is passed into a cylinder chamber 317 to cause the piston 311 to move toward the right (Fig. 3), the yoked member 313 will move the rack bar 295 toward the right (Fig. 14). This movement of the rack bar 295 serves to rotate the gear segment 294 in a counter-clockwise direction so that the ratchet pawl 291 will impart a rotary movement to the ratchet wheel 290 to impart a rotary motion to the vertical shaft 288. Rotary motion of the shaft 288 serves through the worm 287 and the worm gear 286 to rotate the nut 22 (Fig. 3) to impart a forward feeding movement to the grinding wheel 16 and the wheel slide 15.

During this movement of the piston 311, fluid within a cylinder chamber 318 will exhaust in a manner to be hereinafter described. Similarly, when fluid under pressure is admitted to the cylinder chamber 318 to move the piston 311 toward the left, the rack bar 295 moves toward the left to impart a rotary motion to the gear segment 294 during which movement the pawl 291 rides idly over the teeth of the ratchet wheel 290 so as to reset the pawl 291 for the next infeeding movement prior to the second pass of the truing tool across the peripheral face of the grinding wheel. In other words, when the piston 311 is moved toward the right (Fig. 3) and the infeeding movement is imparted to the grinding wheel and when the piston is moved toward the left, a return stroke is imparted to the feed pawl 291 to reset the same.

A shuttle type control valve 320 is provided to control the movement of the piston 311. When fluid under pressure is admitted into the valve chamber 321 from a pipe 322, the valve 320 will be moved toward the right. A ball check valve 323 is opened by fluid under pressure within the pipe 322 so that it by-passes throttle valve 324 to allow substantially unrestricted flow of fluid under pressure into the valve chamber 321. When the valve 320 is moved toward the right (Fig. 3) fluid within a valve chamber 325 may exhaust through a needle valve 326 and through a pipe 327. The needle valve 326 serves to control the rate of movement of the valve 320 during its movement toward the right. A ball check valve 328 is connected so that when fluid under pressure is passed through the pipe 327, it may by-pass the valve 326 and pass through the ball check valve 328 into the valve chamber 325 to move the valve 320 toward the left. During the movement of the valve 320 toward the left, the needle valve 324 serves to control the exhaust of fluid from the valve chamber 321 thereby controlling the rate of movement of the valve 320.

A plurality of passages, ball check valves and throttle valves are provided between the pipe 322 and the valve 320 and also between the pipe 327 and the valve 320 so that when pressure is admitted through either the pipe 322 or the pipe 327, the valve 320 will be moved in one direction during which movement the piston 311 will make one complete reciprocation so that the feed pawl 291 will be given one complete oscillation to impart an infeeding movement to the grinding wheel before each pass of the truing tool across the operative face of the grinding wheel. The pipe 322 is connected by a ball check valve 328, a ball check valve 329, a throttle valve 330 and a ball check valve 331 with the valve 320. The pipe 322 also is connected by a pipe 337 with the valve 320 so that in the position of the parts as shown in Fig. 3, fluid under pressure passing through the pipe 322 will pass through the pipe 337 into a left hand chamber 338 in the valve 320. Similarly, the pipe 327 is connected by a ball check valve 332, a ball check valve 333, a ball check valve 334, a ball check valve 335, and a throttle valve 336 with the valve 320.

When fluid under pressure is passed through the pipe 337 into the valve chamber 338, it will pass through a passage 339 into the cylinder chamber 317 to move the piston 311 toward the right (Fig. 3). During this movement fluid within the cylinder chamber 318 is exhausted through a passage 340 into a valve chamber 341 and out through the valve 336 and 335 into the pipe 327.

The truing control valve 208 is arranged to control the admission of fluid to and from the truing feed mechanism above described. The truing control valve 208 is a piston type valve comprising a valve stem 345 having a plurality of valve pistons formed integrally therewith. The valve stem 345 is normally held in the position illustrated in Fig. 3 by means of a tension spring 346. When it is desired to effect a truing of the grinding wheel 16, a solenoid S2 is energized which serves through a rock arm 347 to shift the valve stem 345 toward the right so that fluid under pressure may be passed through or exhausted from the pipes 322 and 327.

The reverse control valve 44 serves to control the passage of fluid under pressure to and from the truing control valve 208 and serves to reverse the flow of pressure thereto when the table 11 is reversed in its direction of movement. Assuming the solenoid S2 to be energized and the reverse control valve 44 to be in the position illustrated in Fig. 3, fluid under pressure passing through the pipe 41 enters the valve chamber 86 and passes through the pipe 234 through a valve chamber 348 in the truing control valve 208 and through the pipe 327 to cause the valve 320 to move into the position illustrated in Fig. 3. During this movement, fluid may exhaust from the cylinder chamber 317 through the passage 339, through the valve chamber 338, the pipe 337, the pipe 322, and through a chamber 349 in the valve 208, through the pipe 239, through the valve chamber 87 in the reverse control valve 44 and out through the exhaust pipe 240 into the reservoir 38. When the table 11 is reversed at the end of the first truing stroke, the reversing control valve 44 is shifted toward the right (Fig. 3) so that fluid under pressure entering the valve chamber 86 will pass through the pipe 239 and through the valve chamber 349 and the pipe 322 to reverse the direction of movement of the valve 320 to initiate a complete reciprocation of the piston 311. During this latter movement, fluid may exhaust from the valve 320 and the cylinder chamber 318 through the pipe 327, the valve chamber 348, the pipe 234, into the valve chamber 85 in the reverse controlling valve 44, through a central aperture in the valve stem into the valve chamber 87 and pass out through the exhaust pipe 240 into the reservoir 38. It will thus be seen that during the traversing movement of the table 11 while the valves are set in a position for truing, the reverse control valve 44 will control the direction of flow of fluid through the truing control valve 208 to the truing feed unit above described. The actuation of the solenoid S2 will be more fully described hereinafter.

When the solenoid S2 is energized at the start of a truing operation, fluid under pressure passing through the pipe 206 from the feed control valve 129 enters a valve chamber 207a in the truing control valve 208, passes out through a pipe 351 which admits fluid to the cylinder 97 (Fig. 3) to rock the reversing lever 71 in a counter-clockwise direction (Fig. 9) to rock the stud 94 out of the path of the reversing dog 91 (Figs. 7 and 9) so that the table 11 may traverse toward the left beyond the normal grinding position so that the truing tool 273 (Fig. 11) moves toward the peripheral surface of the grinding wheel 16. At the same time fluid under pressure passing into the cylinder 97 continues through the pipe 351 into the valve chamber 58 in the start-stop valve 42. Due to the differential area of the pistons adjacent to the chamber 58, the valve stem 57 is urged in a direction toward the right (Fig. 3) to open the valve so as to start the traversing movement of the table 11. At the same time fluid under pressure passing through the pipe 351 passes through a ball check valve 352 into the pipe 203 to the feed control valve 195 and the backlash control valve 216 rapidly to move the piston 183 toward the right to turn the feed screw 19 and the feed wheel 25 rapidly to bring the stop abutment 191 into engagement with the stop pawl 192 so that the wheel feeding mechanism bears the same relation with the feed screw during the truing operation as when the grinding wheel is in a finish grinding position.

With the truing valve 208 in this position, fluid within cylinder chamber 189 (feed cylinder 182) exhausts through the pipe 190, through the valve chamber located between the valve pistons 198 and 199 (valve 195), through the pipe 224, the selector valve 115, the pipe 226 and through a pipe 375 which by-passes plunge-cut control valve 227 when the selector valve 115 is positioned as shown for a plunge-cut grinding operation, or by-passes the traverse feed control valve 242 if selector control valve 115 is positioned for traverse grinding operation. Fluid exhausting through either the pipe 375 or the pipe 241 passes through a chamber 376 (truing valve 208), through a pipe 377 and a throttle valve 378 into the reservoir 38. The throttle valve 378 (Fig. 3) may be set so that a more rapid movement of the feed piston 183 is obtained, rapidly to move the stop abutment 191 into engagement with the feed stop pawl 192 to position the grinding wheel 16 for a truing operation.

In case a conventional type wheel spindle reciprocating mechanism is employed for reciprocating the wheel spindle axially during a plunge-cut grinding operation, it is desirable to provide means for automatically stopping the reciprocation during a truing operation. Fluid under pressure passing through the pipe 351, when a truing cycle is initiated, may pass through a pipe 373 into a cylinder 370 to move a piston 371 toward the left (Fig. 3) against the tension of a spring 372. Movement of the piston 371 toward the left serves automatically to stop reciprocation of the wheel spindle.

In the position of valve 208 (Fig. 3) fluid may exhaust from valve chamber 58 (start-stop valve 42), from cylinder 97 (reversing lever 71) and from cylinder 370 (wheel spindle reciprocation control), through the pipe 351 into the valve chamber 350 (truing control valve 208) and out through an exhaust pipe 351a into the reservoir 38.

The stud 94 on the reversing lever 71 (Fig. 7) is normally engaged by reversing dogs 90 and 91 which serve to determine the length of the reciprocatory stroke of the table 11.

A stop latch 355 is pivotally supported by a stud 356 carried by the reversing dog 90. As shown in Fig. 7, the latch 355 engages a roller 357 which is supported by a stud 358 at one end of a connecting rod 359. The other end of the connecting rod 359 is connected by a stud 360 with the start-stop lever 45. A wedge shaped cam 361 is adjustably mounted on the base 10 and is held in adjusted position thereon by means of a clamping screw 362. The latch 355 and the wedge shaped cam 361 serve to limit the movement of the roller 357 toward the left thus preventing movement of the start-stop lever 55 in a counter-clockwise direction to start the traversing movement of the table 11. The latch 355 and the cam 361 as positioned in Fig. 7 serve to shift the start-stop lever to a stop position so as to stop the movement of the table 11 toward the right before the stud 94 on the reversing lever 71 engages the left hand reversing dog 90.

When it is desired to start a truing operation, the latch 355 is rocked in a counter-clockwise direction so that fluid under pressure within the valve chamber 58 (Fig. 3) may shift the valve stem 57 toward the right to start movement of the table 11 toward the right at a rapid rate as governed by the grinding speed control valve 63. This rapid movement of the table toward the right continues until reversing dog 90 engages the stud 94 and rocks the reversing lever 71 in a clockwise direction to shift the table reversing valve 43 and the reverse control valve 44 toward the left into the positions illustrated in Fig. 8.

This shifting movement of the reversing lever 71 and the valves 43 and 44 serves to reverse the direction of movement of the table 11 and to start the table 11 moving toward the left. Due to the fact that the stud 94 has been rocked out of the path of the reversing dog 91, the table 11 will travel toward the left beyond the normal grinding stroke. The movement of the table toward the left will continue until the truing dog 95 engages the stud 94 on the reversing lever 71 and again rocks the reversing lever in a counter-clockwise direction to shift the reversing valve 43 and the reverse control valve 44 into reverse positions to reverse the travel of the table 11 for the second pass of the truing tool across the face of the grinding wheel 16.

The table 11 moves rapidly toward the left until after it passes the table dog 91. The rapid motion of the table 11 toward the left continues until a roller 363 which is supported by the start-stop lever 51 engages a cam face 364 on a truing dog 365. As the cam 364 moves toward the left, the roller 363 and the start-stop lever 51 are rocked in a clockwise direction to shift the lever 51 from a grinding to a truing position. This movement of the start-stop lever 51 serves to shift the valve stem 57 of the start-stop valve 42 so as to render the grinding speed control valve 63 inoperative so that fluid passes through the truing speed control valve 64 which reduces the speed of movement of the table 11 to a pre-set slow truing speed. Due to a horizontal plane surface 366 on the truing dog 365, the table will continue to move at a slow truing speed during the entire movement of the table toward the left while the truing tool 273 is passing toward the left across the peripheral face of the grinding wheel 16.

The movement of the table 11 toward the left, during truing, continues until the truing dog 95 engages the stud 94 on the reversing lever 71 and rocks the reversing lever in a counter-clockwise direction so as to reverse the table and start it moving toward the right for a second pass of the truing tool across the periphery of the wheel. During the period of reversal of the table 11, the truing feeding mechanism previously described advances the grinding wheel toward the diamond by a predetermined amount.

The traversing movement of the table toward the right on the second pass of the truing tool continues until the latch 367 engages the roller 363 (position 363a, Fig. 7) and again rocks the start-stop lever 45 in a clockwise direction to shift the start-stop valve 42 into a stop position. The latch 367 is pivotally supported by a stud 368 on the truing dog 365. The latch surface 367 is concentric with the axis of the stud 368 so that the latch 367 may be readily rocked in a counter-clockwise direction to release the roller 363 when it is desired to resume a grinding operation.

If only one complete reciprocation of the truing tool across the face of the grinding wheel 16 is required, then tripping of the latch 367 will allow the table to move toward the right into a grinding position. Movement of the table to the right continues until the stud 94 on the reversing lever 71 passes the dog 91 and the latch 355 moves into engagement with the roller 357 which engages cam 361 and serves to shift the start-stop lever 51 into a table stop position. A plunge-cut grinding operation may then be readily resumed.

If, however, when one complete reciprocation of the truing tool across the face of the grinding wheel has been completed and the roller 363 is engaged by the latch 367 to throw the start-stop lever 45 to a stop position, a second truing cycle may be obtained by manually shifting the table reversing lever 71 in a clockwise direction. To start the table 11 moving toward the left for a second truing cycle, latch 367 is manually moved to release the roller 363. The cycle above described is then repeated with the wheel being advanced by a predetermined increment before each pass of the truing tool across the face of the wheel. Any number of cycles may be obtained in a similar manner if required.

If the grinding machine is set up for a traverse grinding operation, that is with selector valve lever 205 in position 205a (Fig. 3), then latch 355 must be rocked in a counter-clockwise direction and the locking lever 369 also rocked in a counter-clockwise direction to lock the latch 355 into an inoperative position so as to permit the manual actuation of the start-stop lever 51 to control the starting and stopping of a traverse grinding operation. When the machine is set up as above described for a traverse grinding operation, it is merely necessary to release the locking lever 369 and to shift the latch 355 into the position shown in Fig. 7 to start a truing cycle. The latch 355 and the cam 361 serve when engaged by the roller 357 to rock the start-stop lever 51 into a stop position to stop the table 11 slightly before the stud 94 of the reversing lever 71 engages the left hand table dog 90 as the table 11 moves toward the right.

To start a truing cycle when the grinding machine is either set for plunge-cut or traverse grinding, it is merely necessary for the operator to actuate a selector switch 390 (Fig. 4) and then to release the latch 355 (Fig. 7) as above described.

To facilitate automatic operation of the machine, a rod 165 (Figs. 3 and 6) is fixedly mounted on the sleeve 125. The sleeve 125 interconnects the feed screw 19 with the piston 127 so that the rod 165 moves in an axial direction during movement of the piston 127. The rod 165 serves as a dog bar to support a pair of adjustable dogs 167 and 168 which are arranged to actuate limit switches LS2 and LS3 respectively. The limit switch LS2 is a normally closed limit switch which is mounted in fixed relationship with the base 10 of the machine. The limit switch LS3 is a normally open limit switch which is supported by a bracket 169 which in turn is supported by a threaded stud 170 which is adjustably mounted on the rear end of the cylinder 128.

For a grinding wheel truing operation it is necessary to move the grinding wheel slide 15 and piston 127 to an extreme rearward or inoperative position so that when the table 11 is traversed for a truing operation, the grinding wheel will clear the footstock 265. Between grinding operations, it is necessary that the grinding wheel 16 be retracted only a relatively short distance sufficient to facilitate removal of the finish ground work piece. After a grinding operation has been completed and the solenoid S1 is deenergized, the released compression of the spring 143 shifts the valve 129 into the position illustrated in Fig. 6. During the rearward movement of the wheel slide, solenoid S4 is energized to open the valve 160 to facilitate a rapid rearward movement of the piston 127. If the selector switch 390 (Fig. 4) is set for a grinding operation, the piston 127 will move toward the right until the dog 167 opens the normally closed limit switch LS2 which deenergizes the solenoid S4 thus closing the valve 160 to cut off the exhaust of fluid from the cylinder chamber 139 to stop the rearward movement of the grinding wheel 16 to facilitate removal of the finish ground work piece and the loading of a new work piece into the machine.

If the selector switch 390 is turned to a truing position, the relay switch CR2 is energized which serves to energize solenoid S4 to open the valve 160 so that the grinding wheel 16 and piston 127 will travel to an extreme rearward position as illustrated in Fig. 6. When the piston 127 reaches a rearward position, the dog 168 closes the normally open limit switch LS3 which serves to energize the solenoid S2 which shifts the truing control valve 208 into a truing position. When the valve 208 is in an energized position, fluid under pressure passes in a manner above described. Limit switch LS3 serves as a safety device to initiate an automatic truing cycle only when the wheel slide is in an extreme rearward position so that grinding wheel is out of the path of the footstock. In this position of the parts, the truing cycle may be initiated as above described by releasing the latch 355.

As shown in Fig. 4, when the selector switch 390 is in a grinding position, the relay CR2 is deenergized so that when the valve 250 is actuated to close the limit switch LS1, thereby energizing a relay CR1 to start both the coolant motor 256 and the work drive motor 257. When the machine is conditioned for a truing operation, it is desirable that the work rotation be stopped during a truing operation. This is preferably accomplished by connecting the work drive motor 257 through a contactor in the relay CR2 so that when the selector switch 390 is shifted to a truing position to energize relay CR2, the circuit to the work drive motor 257 will be rendered inoperative. In this position of the parts, when the valve 250 is actuated to close the limit switch LS1 thereby energizing the relay CR1, only the coolant motor 256 will be started to supply coolant fluid to the grinding wheel 16 and the truing tool 273 during a grinding wheel truing operation.

To facilitate starting and stopping the transverse movement of the grinding wheel slide 15, a manually operable lever 391 (Figs. 2 and 4) is pivotally supported by a stud 392 on the front of the machine base. When the lever 391 is rocked in a clockwise direction (Fig. 4), it closes a start switch 393 which serves to close a circuit to energize solenoid S1 so as to shift the feed control valve 129 to admit fluid under pressure into cylinder chamber 139 to cause a forward feeding movement of the grinding wheel 16. Similarly, if it is desired to stop the grinding cycle either before or after a grinding operation has been completed, the lever 391 may be rocked in a counter-clockwise direction to open the start switch 393 and to close a stop switch 394 which serves to deenergize the solenoid S1 so as to release the compression of the spring 143 thereby shifting the feed control valve 129 so as to admit fluid under pressure to the cylinder chamber 138 to cause a rearward feeding movement of the grinding wheel 16. When the control valve 129 is shifted to cause either a forward or rearward feeding movement of the grinding wheel 16, fluid under pressure is also passed in a manner above described to the feed cylinder 182 to rotate the feed screw 19 thereby causing slow infeeding movement for the grinding operation. As above described, movement of the piston 127 (Fig. 6) serves to cause a rapid approaching or receding movement of the grinding wheel 16 and movement of the piston 183 serves to cause a rotation of the feed screw 19 to produce a fine grinding feed. During the rearward movement of the grinding wheel, the feed screw 19 is rotated in a reverse direction to back off the grinding wheel by an amount equal to the infeeding movement thereof so that the grinding wheel is positioned for the next grinding operation.

A push button switch 395 is provided on the front of the machine base for starting the wheel driving motor 18. A push button switch 396 is a stop switch to facilitate stopping the wheel driving motor 18 when desired. A push button switch 397 is provided for starting both the coolant pump motor and the pump driving motor 36. A push button switch 398 is provided to stop the motor 36.

A manually operable snap switch 400 is provided which may be positioned either for manual or automatic control of the work driving motor. In the position of the switch 400 (Fig. 2) the circuit is closed for automatic operation of the work rotation in which case limit switch LS1 controls the starting and stopping of the work rotation in timed relation with the operation of the other mechanisms of the machine. If the switch 400 is snapped approximately 90° in a counter-clockwise direction into a hand position, a manually operable lever 401 serves to control the starting or stopping of the work driving motor.

Figure 2:
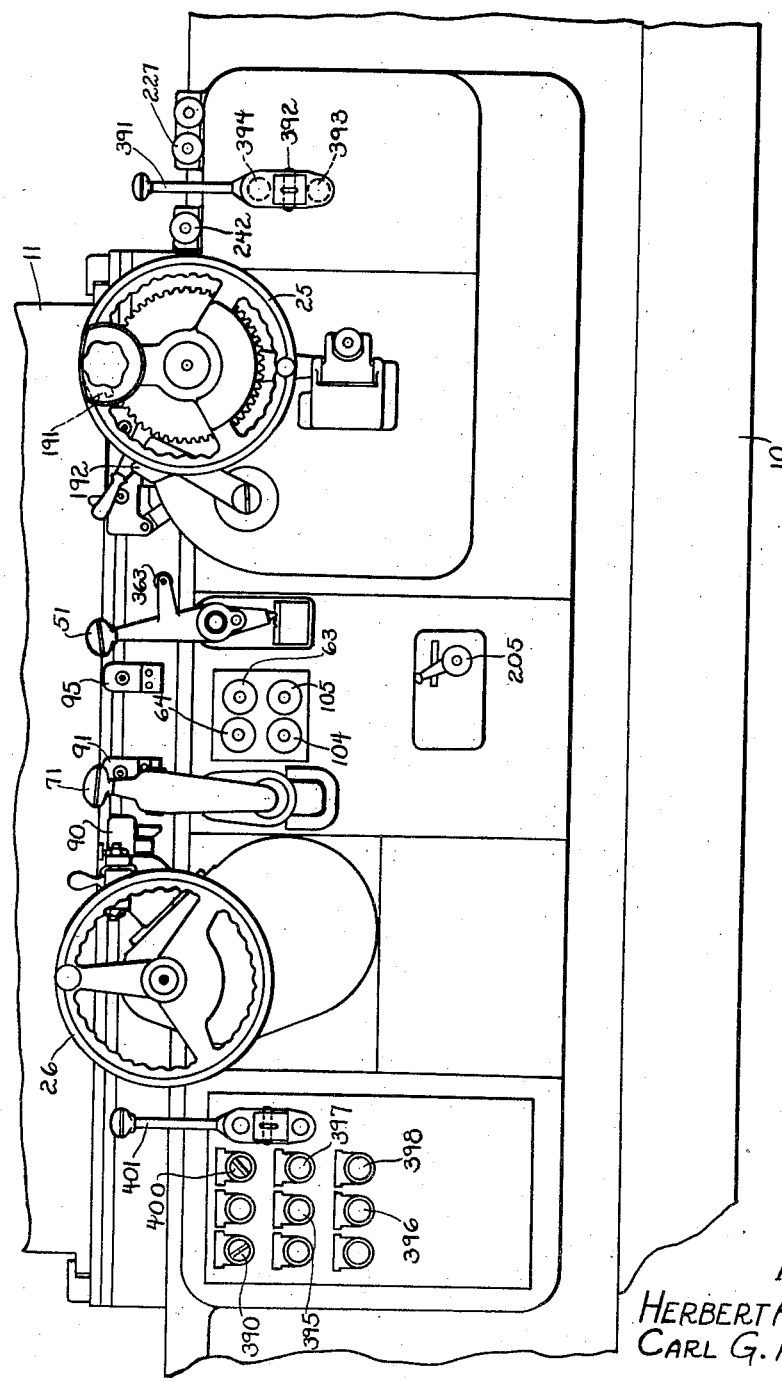
Fig. 2 is a fragmentary front elevation of a portion of the front of the improved grinding machine.

The operation of this improved machine will be readily apparent from the foregoing disclosure. Assuming the machine to be set up for a plunge-cut grinding operation, the selector valve control lever 205 is positioned as shown in Figs. 2 and 3 and the selector switch 390 is positioned for a grinding operation as shown in Fig. 4, a grinding operation may be initiated by actuation of the wheel slide control lever 391 in a clockwise direction (Fig. 4). The actuation of the lever 391 serves to close the start switch 393 to energize solenoid S1 thereby shifting the feed control valve 129 to admit fluid under pressure to the cylinder chamber 139 to cause a rapid approaching movement of the grinding wheel which continues until the button 180 on the forward end of the feed screw shaft 179 engages the end of the stop screw 181 carried by the shaft 177 (Fig. 5). Simultaneously with the admission of fluid to cylinder chamber 139, fluid under pressure is admitted to the cylinder chamber 188 in the feed cylinder 182 (Fig. 3) to cause the piston 183 to move first at a rapid rate as controlled by the backlash valve 216 above described to take up the backlash in the gearing and the nut 22 and screw 19 after which the piston 183 moves at a slower rate to turn the feed screw 19 at a predetermined rate to cause the desired infeeding movement of the grinding wheel 16. The infeeding movement of the grinding wheel 16 as caused by the movement of the piston 183 toward the right (Fig. 3) continues until the stop abutment 191 engages the stop pawl 192 which stops the advancing movement of the grinding wheel 16. The wheel 16 may then be retracted by shifting the feed control lever 391 in a counter-clockwise direction (Fig. 4) to actuate the stop switch and thereby to break a circuit so as to deenergize the solenoid S1 thus releasing the compression of the spring 143 to return the valve 129 into the position illustrated in Fig. 6. In this position of the valve 129, fluid under pressure is admitted to the cylinder chamber 138 and also to the cylinder chamber 189 to first cause a rapid movement of the piston 183 in a direction toward the left (Fig. 3) rapidly to turn the feed screw to its initial position after which the valve 162 (Fig. 6) is opened to allow fluid to exhaust from cylinder chamber 139 rapidly to allow the piston 127 to move rearwardly to an inoperative position. As above described, the piston 127 does not move to the extreme right hand end of the cylinder 128 except when the machine is set for a grinding wheel truing operation. On the return movement of the wheel after a grinding operation, the dog 167 opens the normally closed limit switch LS2 to deenergize the solenoid S4 thus closing the valve 160 to stop the rearward movement of the wheel slide for a loading operation.

When it is desired to effect a truing operation of the grinding wheel, when the machine is set for a plunge-cut grinding operation, it is merely necessary to shift the selector switch 390 to a truing position (Fig. 4) and to release the latch 355 so that fluid under pressure may shift the start-stop valve 42 to initiate a longitudinal movement of the table 11 in a manner above described to pass the truing tool 273 through one complete reciprocation across the operative face of the grinding wheel 16. Before each pass of the truing tool across the wheel face, an infeeding movement is imparted to the nut 22 so as to advance the grinding wheel 16 by a predetermined amount for a truing operation. When the selector switch is shifted to a truing position, the wheel slide moves to an extreme rearward position as above described and fluid under pressure is admitted to cylinder chamber 188 rapidly to rotate the feed screw until the stop abutment 191 engages the stop pawl 192 so that the stop and abutment bear the same relation with the feed screw in the truing operation as in a finish grinding position. The grinding wheel may be trued by one complete reciprocation of the truing tool or if desired any number of complete reciprocations may be obtained depending upon how much of a truing operation is desired and required. After a truing operation has been completed, the latch 367 is swung to an inoperative position to allow the table 11 to return to its normal grinding position after which a grinding operation may be resumed without the necessity of resetting the feed stop abutment 191.

The machine may also be set up for a traverse grinding operation in which case the selector valve control lever 205 is shifted to position 205a (Fig. 3) after which the start-stop lever 51 is moved in a counter-clockwise direction to shift the start-stop valve 42 toward the right so as to start a reciprocating movement of the table 11. The stroke of the table 11 is controlled by table dogs 90 and 91 and the speed of the movement of the table is controlled by valve 63. After a work piece has been loaded into the machine and the table 11 set in motion, the wheel slide may be moved forward by shifting the wheel slide control lever 391 in a clockwise direction (Fig. 4) the same as in a plunge-cut grinding operation. When the parts are set for a traverse grinding operation, the wheel is moved rapidly toward the work by means of a piston 127. Actuation of the start-stop lever 51 then serves to actuate the feed control valve 195 to start movement of the piston 183 toward the right first at a rapid rate to take up the backlash in the feed mechanism parts and thereafter is fed by predetermined increments at the ends of the table stroke during the period of reversal as controlled by the picker feed valve 230.

During both plunge-cut and traverse grinding operations, the actuation of the valve 250 serves to control the actuation of the limit switch LS1 so that during a grinding operation both the work drive motor 257 and the coolant drive motor 256 are operative and during a truing operation so that only the coolant drive motor 256 is operative.

When the machine is set for a traverse grinding operation, the latch 355 is locked in an inoperative position as above described. When it is desired to start a truing cycle (during traverse grinding) it is merely necessary to shift the selector switch 390 to a truing position after which the locking lever 369 is moved into the position illustrated in Fig. 7 to allow the latch 355 to assume the position illustrated in which position the start-stop lever 45 is shifted to a stop position by engagement of the roller 357 with the latch 355 and the cam 361 just before the stud 94 of the reversing lever 71 engages table dog 90. The truing operation may then be started by releasing the latch 355 after which the truing cycle functions in a manner the same as that above described in connection with plunge-cut operations. The truing tool may be passed one complete reciprocation after which a traverse grinding operation may be resumed, or the truing cycle may be repeated as many times as desired.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

We claim:

1. In a grinding machine having a base, a longitudinally reciprocable table thereon, a transversely movable slide on said base, a rotatable grinding wheel on said slide, means including a reversing lever to reciprocate said table, adjustable table dogs to actuate said lever to determine the normal reciprocatory stroke of said table, a wheel feeding mechanism for said slide including a nut and screw, power operated means to rotate said screw to impart an infeeding movement to said grinding wheel, an automatically operated grinding wheel truing apparatus including a truing tool on said table, means to render one of said table dogs ineffective so as to extend the normal travel of the table to pass the truing tool across the face of the grinding wheel, an adjustable truing dog to reverse the direction of travel of the table after the grinding wheel has completed a pass across said wheel, means automatically to rotate said nut to impart an infeeding movement to the grinding wheel before each pass of the truing tool across the face of the grinding wheel, and means to stop said table after one complete reciprocation of the truing tool.

2. In a grinding machine having a base, a longitudinally reciprocable table thereon, a transversely movable slide on said base, a rotatable grinding wheel on said slide, means including a reversing lever to reciprocate said table, adjustable table dogs to actuate said lever to determine the normal reciprocatory stroke of said table, a wheel feeding mechanism for said slide including a nut and screw, power operated means to move said screw axially rapidly to move the grinding wheel toward and from an operative position, power operated means to rotate said screw to impart an infeeding movement to said grinding wheel, an automatically operated grinding wheel truing apparatus including a truing tool on said table, means to render one of said table dogs ineffective so as to extend the normal travel of the table to pass the truing tool across the face of the grinding wheel, an adjustable truing dog to reverse the direction of travel of the table after the grinding wheel has completed a pass across said wheel, means including a second truing dog to slow down the speed of the table during the truing operation, means including a pawl and ratchet mechanism automatically to rotate said nut to impart an infeeding movement to the grinding wheel before each pass of the truing tool across the face of the grinding wheel, and means to stop said table after one complete reciprocation of the truing tool.

3. In a grinding machine having a base, a longitudinally reciprocable table thereon, a transversely movable slide on said base, a rotatable grinding wheel on said slide, means including a reversing lever to reciprocate said table, adjustable table dogs to actuate said lever to determine the normal reciprocatory stroke of said table, a wheel feeding mechanism for said slide including a nut and screw, power operated means to move said screw axially rapidly to move the grinding wheel toward and from an operative position, power operated means to rotate said screw to impart an infeeding movement to said grinding wheel, an automatically operated grinding wheel truing apparatus including a truing tool on said table, means to control said first power operated means to move said screw axially to an extreme rearward position for a truing operation, control means to render said truing apparatus operative only when the grinding wheel is in an extreme rearward position, means to render one of said table dogs ineffective so as to extend the normal travel of the table to pass the truing tool across the face of the grinding wheel, an adjustable truing dog to reverse the direction of travel of the table after the grinding wheel has completed a pass across said wheel, means including a second truing dog to slow down the speed of the table during the truing operation, means including a pawl and ratchet mechanism automatically to rotate said nut to impart an infeeding movement to the grinding wheel before each pass of the truing tool across the face of the grinding wheel, and means to stop said table after one complete reciprocation of the truing tool.

4. In a grinding machine having a base, a longitudinally reciprocable table, a transversely movable slide on said base, a rotatable grinding wheel on said slide, a fluid motor to reciprocate said table, means including a reversing lever and valves to control the admission to and exhaust of fluid from said motor, adjustable table dogs to actuate said lever to determine the normal reciprocatory stroke of said table, a wheel feeding mechanism for said slide including a nut and screw, a fluid motor to actuate said screw to impart a grinding feed to said grinding wheel, an automatically operated grinding wheel truing apparatus including a truing tool on said table, means to move said reversing lever out of the path of one of said table dogs so as to extend the normal travel of the table to pass the truing tool across the operative face of the grinding wheel, an adjustable truing dog to reverse the direction of movement of the table thereafter, means including a hydraulically operated pawl and ratchet mechanism to rotate said nut so as to impart an infeeding movement to the grinding wheel before each pass of the truing tool, and means including a latch to stop said table after one complete reciprocation of the truing tool.

5. In a grinding machine as claimed in claim 4, in combination with the parts and features therein specified of an adjustable stop which rotates with said feed screw, a pivotally mounted stop pawl on said base to limit the rotation of said feed screw when the work has been ground to a predetermined size, a selector switch having a grinding and a truing position, a solenoid actuated valve to control a truing cycle, means including a limit switch actuated by the wheel slide in an extreme rearward position to energize said solenoid when the selector switch is in a truing position, and means controlled by said valve to facilitate a rapid rotation of the feed screw to move the stop into engagement with the pawl to position the wheel feeding mechanism parts in a finish grinding position during a truing operation so that grinding may be resumed after a truing operation without the necessity of readjusting the stop.

6. In a grinding machine having a base, a longitudinally reciprocable table, a transversely movable slide on said base, a rotatable grinding wheel on said slide, a fluid motor to reciprocate said table, means including a reversing lever and valves to control the admission to and exhaust of fluid from said motor, adjustable table dogs to actuate said lever to determine the normal reciprocatory stroke of said table, a wheel feeding mechanism for said slide including a nut and screw, a fluid motor to move said screw axially rapidly to move said grinding wheel to and from an operative position, a fluid motor to rotate said screw to impart a grinding feed to said grinding wheel, an automatically operated grinding wheel truing apparatus including a truing tool on said table, means to move said reversing lever out of the path of one of said table dogs so as to extend the normal travel of the table to pass the truing tool across the operative face of the grinding wheel, an adjustable truing dog to reverse the direction of movement of the table thereafter, means including a hydraulically operated pawl and ratchet mechanism to rotate said nut so as to impart an infeeding movement to the grinding wheel before each pass of the truing tool, and means including a latch to stop said table after one complete reciprocation of the truing tool.

7. In a grinding machine having a base, a longitudinally reciprocable table thereon, a transversely movable slide on said base, a rotatable grinding wheel on said slide, means including a fluid motor to reciprocate said table, means including adjustable dogs on said table to actuate said reversing valve so as to determine the normal reciprocatory stroke of the table, a wheel feeding mechanism including a nut and screw, means including a fluid motor to rotate said screw so as to impart a grinding feed to said wheel, a truing tool on said table, an independent truing dog on said table, means including a fluid motor to rotate said nut relative to said screw to impart an infeeding movement to the slide before each pass of the truing tool across the face of the grinding wheel, and means including a latch to stop said table after one complete reciprocation of the truing tool.

8. In a grinding machine having a base, a longitudinally reciprocable table thereon, a transversely movable slide on said base, a rotatable grinding wheel on said slide, means including a fluid motor to reciprocate said table, a reversing valve, a start-stop-speed control valve, means including adjustable dogs on said table to determine the normal reciprocatory stroke of the table, a wheel feeding mechanism including a nut and screw, means including a fluid motor to rotate said screw so as to impart a grinding feed to said wheel, a truing tool on said table, an independent truing dog on said table to reverse the direction of movement of the table after the truing tool passes across the face of the grinding wheel, means including a second truing dog having a cam to actuate said speed control valve to slow down the normal table movement to a slow truing speed during the truing operation, means including a fluid motor to rotate said nut relative to said screw to impart an infeeding movement to the slide before each pass of the truing tool across the face of the grinding wheel, and means including a latch to stop said table after one complete reciprocation of the truing tool.

9. In a grinding machine having a base, a longitudinally reciprocable table thereon, a transversely movable slide on said base, a rotatable grinding wheel thereon, a fluid motor to reciprocate said table, means including a reversing valve to reverse the flow of fluid to said motor, a start-stop-speed control valve to control the exhaust of fluid from said motor, a reversing lever and adjustable table dogs to actuate the reversing valve to control the normal reciprocatory stroke of the table, a wheel feeding mechanism for said slide including a nut and screw, a fluid motor to move said screw axially rapidly to move said grinding wheel to and from an operative position, a fluid motor to rotate said screw to impart a grinding feed to said wheel, an automatic truing apparatus including a truing tool on said table, means automatically to extend the reciprocatory stroke of the table to pass the truing tool across the operative face of the grinding wheel, a solenoid actuated truing control valve, a selector switch having a grinding and a truing position to energize a circuit, means including a limit switch actuated by the wheel slide in a rearward position to energize said solenoid to initiate a truing cycle, and means to rotate said nut to impart an infeeding movement of the grinding wheel before each pass of the truing tool across the face of the wheel.

10. In a grinding machine as claimed in claim 9, in combination with the parts and features therein specified in which the nut is rotated by a pawl and ratchet, a piston and cylinder to actuate said pawl, and a fluid pressure operated control valve interposed between the truing control valve and the cylinder to move the piston through one complete reciprocation so as to actuate said pawl and ratchet to impart an infeeding movement to the grinding wheel before each pass of the truing tool across the face of the wheel.

11. In a grinding machine as claimed in claim 9, in combination with the parts and features therein specified in which the nut is rotated by a pawl and ratchet mechanism, a piston and cylinder to actuate said pawl, and a shuttle type control valve interposed between the truing control valve and the cylinder, said valve being arranged so that movement of the valve in one direction imparts one complete reciprocation to said piston so as to actuate the pawl and ratchet to produce an infeeding movement of the grinding wheel before each pass of the truing tool across the face of the grinding wheel.

12. In a grinding machine as claimed in claim 9, in combination with the parts and features therein specified in which the nut is rotated by a pawl and ratchet, a piston and cylinder to actuate said pawl, a shuttle type control valve for said cylinder which is arranged so that movement of the valve in one direction imparts one complete reciprocation to the piston to oscillate said pawl and cause an infeeding movement of the grinding wheel, and independent valves connected with each end of said shuttle valve independently to control the speed of movement of the shuttle valve in either direction thereby to control the length of the reciprocatory stroke of the piston so as independently to vary the extent of infeed of the grinding wheel before each pass of the truing tool.

13. In a grinding machine as claimed in claim 9, in combination with the parts and features therein specified of a manually operable lever to actuate the start-stop-speed control valve, an end chamber in said control valve, fluid connections between said chamber and the truing control valve, said connections serving when the solenoid is energized to admit fluid under pressure to the end chamber to exert a pressure tending to shift said valve to a start position, means including a latch to shift said manually operable lever to a stop position when the selector switch is turned to a truing position to stop the table as it moves toward the right, said fluid connections also serving to shift the reversing lever out of the path of one of the table dogs to facilitate extending the table movement to pass the truing tool across the face of the grinding wheel when the latch is released, and means to release said latch so that fluid under pressure in the end chamber shifts the valve to a start position to initiate a truing cycle.

14. In a grinding machine as claimed in claim 9, in combination with the parts and features therein specified in which the nut is rotated by a pawl and ratchet, a piston and cylinder to actuate said pawl, a shuttle type control valve for said cylinder which is arranged so that movement of the valve in one direction imparts one complete reciprocation to the piston to oscillate said pawl so as to cause an infeeding movement of the grinding wheel, fluid connections between said shuttle valve and said table reverse valve so that the actuation of the feed piston is controlled by the direction of movement of the table, and independent valves connected with each end of the shuttle valve independently to control the speed of movement of the shuttle valve in either direction so that a long stroke of the piston may be obtained prior to the first pass of the truing tool across the wheel face and a shorter feeding stroke of the piston obtained from the second pass of the truing tool to facilitate independently varying the extent of infeed of the grinding wheel before each pass of the truing tool.

15. In a grinding machine as claimed in claim 9, in combination with the parts and features therein specified in which the nut is rotated by a pawl and ratchet, a piston and cylinder to actuate said pawl, a fluid pressure operated control valve interposed between the truing control valve and the cylinder to move the piston through one complete reciprocation so as to actuate said pawl and ratchet to impart an infeeding movement of the grinding wheel before each pass of the truing tool across the face of the wheel, and manually operable means to actuate said pawl and ratchet to facilitate actuation of the feed nut so as to compensate for wheel wear between truing operations.

16. In a grinding machine as claimed in claim 9, in combination with the parts and features therein specified of a manually operable means to facilitate adjusting the truing tool toward and from the grinding wheel, and means including a dial indicator to facilitate precise adjustment of the truing tool so as to compensate for wear of the truing tool.

17. In a grinding machine as claimed in claim 9, in combination with the parts and features therein specified of a manually operable lever to actuate said start-stop-speed control valve to facilitate starting and stopping the table and controlling the speed thereof during a traverse grinding operation, an end chamber in said control valve, fluid connections between said chamber and the truing control valve, said connections serving when the solenoid is energized to admit fluid under pressure to the end chamber to exert a pressure tending to shift said valve to a start position, means including a latch to shift said manually operable lever to a stop position when the selector switch is turned to a truing position to stop the table as it moves toward the right, means to lock said latch in an inoperative position during a traverse grinding operation, said fluid connections serving also to shift the reversing lever out of the path of one of the table dogs to facilitate the table movement to pass the truing tool across the face of the grinding wheel when the latch is released, and means to release said latch so that fluid under pressure in said end chamber shifts the start-stop-speed control valve to a start position to initiate a truing cycle.

18. In a grinding machine having a base, a longitudinally reciprocable table, a transversely movable wheel slide on said base, a rotatable grinding wheel on said slide, a piston and cylinder to reciprocate said table, means including a reversing lever and reversing valves to control the admission and exhaust of fluid from said cylinder, adjustable table dogs to actuate said lever to determine the normal reciprocatory stroke of said table, a wheel feeding mechanism for said slide including a nut and screw, a fluid motor to rotate said screw to impart a grinding feed to said wheel, a fluid motor to move said screw axially to move said grinding wheel to and from an operative position, a limit switch actuated by rearward movement of said grinding wheel, a solenoid valve actuated thereby to stop the rearward movement of the grinding wheel in a loading position, means including a selector switch to initiate an automatic truing operation of the grinding wheel, and connections between the selector switch and the solenoid valve which are arranged so that when the selector switch is turned to a truing position the solenoid valve is opened to facilitate movement of the grinding wheel to an extreme rearward position for a truing operation.

19. In a grinding machine having a base, a longitudinally reciprocable table thereon, a transversely movable slide on said base, a rotatable grinding wheel thereon, a fluid motor to reciprocate said table, means including a reversing valve to reverse the flow of fluid to said motor, a start-stop-speed control valve to control the exhaust of fluid from said motor, a reversing lever and adjustable table dogs to actuate said reversing valve to control the normal reciprocatory stroke of the table, a wheel feeding mechanism for said slide including a nut and screw, a fluid motor to move said screw axially rapidly to move the grinding wheel to and from an operative position, a fluid motor to rotate said screw to impart a grinding feed to said wheel, an automatic truing apparatus including a truing tool on said table, means automatically to extend the reciprocatory stroke of the table to pass the truing tool across the operative face of the grinding wheel, a solenoid actuated truing control value, a selector switch having a grinding and a truing position to energize a circuit, and means including a limit switch actuated by the wheel slide in a rearward position to energize said solenoid so as to initiate a truing cycle only when the wheel slide is in an extreme rearward position.

HERBERT A. SILVEN.
CARL G. FLYGARE.

REFERENCES CITED

The following references are of record in the file of this patent:

UNITED STATES PATENTS

| Number | Name | Date |
|---|---|---|
| 2,011,705 | Blood et al. | Aug. 20, 1935 |
| 2,150,749 | Price et al. | Mar. 14, 1939 |
| 2,211,530 | Balsiger et al. | Aug. 13, 1940 |
| 2,335,356 | Price et al. | Nov. 30, 1943 |
| 2,453,678 | Silven | Nov. 9, 1948 |